(12) United States Patent
Zhang et al.

(10) Patent No.: US 12,235,547 B2
(45) Date of Patent: Feb. 25, 2025

(54) LIQUID CRYSTAL DISPLAY PANEL AND METHOD FOR MANUFACTURING SAME, AND DISPLAY DEVICE

(71) Applicants: CHENGDU BOE DISPLAY SCI-TECH CO., LTD., Sichuan (CN); BOE Technology Group Co., Ltd., Beijing (CN)

(72) Inventors: Shaoping Zhang, Beijing (CN); Jia Liu, Beijing (CN); Chao Tong, Beijing (CN); Ning Miao, Beijing (CN); Ying Wang, Beijing (CN); Liangliang Li, Beijing (CN); Bin Luo, Beijing (CN); Jiajin Liu, Beijing (CN)

(73) Assignees: CHENGDU BOE DISPLAY SCI-TECH CO., LTD., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/015,514

(22) PCT Filed: Dec. 30, 2021

(86) PCT No.: PCT/CN2021/143422
§ 371 (c)(1),
(2) Date: Jan. 10, 2023

(87) PCT Pub. No.: WO2023/123294
PCT Pub. Date: Jul. 6, 2023

(65) Prior Publication Data
US 2024/0272492 A1  Aug. 15, 2024

(51) Int. Cl.
*G02F 1/1343* (2006.01)
*G02F 1/1337* (2006.01)

(52) U.S. Cl.
CPC ...... *G02F 1/134336* (2013.01); *G02F 1/1337* (2013.01); *G02F 1/13439* (2013.01)

(58) Field of Classification Search
CPC ............. G02F 1/134336; G02F 1/1337; G02F 1/13439
See application file for complete search history.

(56) References Cited

U.S. PATENT DOCUMENTS

| | | |
|---|---|---|
| 2008/0297708 A1 | 12/2008 | Yang et al. |
| 2018/0107088 A1 | 4/2018 | Wang et al. |

(Continued)

FOREIGN PATENT DOCUMENTS

| | | |
|---|---|---|
| CN | 102253533 A | 11/2011 |
| CN | 105676511 A | 6/2016 |

(Continued)

*Primary Examiner* — Lucy P Chien
(74) *Attorney, Agent, or Firm* — IPro, PLLC

(57) ABSTRACT

Provided is a liquid crystal display panel. The liquid crystal display panel includes: a first substrate and a second substrate that are opposite to each other, and a liquid crystal layer between the first substrate and the second substrate. The liquid crystal display panel includes a plurality of sub-pixel regions. Each of the plurality of sub-pixel regions includes 4N sub-pixel sub-regions arranged in a single column, and the 4N sub-pixel sub-regions are organized into one group, or a plurality of groups that are adjacent to each other. A same group of sub-pixel sub-regions includes two first sub-regions and two second sub-regions. N is an integer greater than or equal to 1.

16 Claims, 11 Drawing Sheets

(56) References Cited

U.S. PATENT DOCUMENTS

| | | | |
|---|---|---|---|
| 2018/0284544 | A1 | 10/2018 | Shimoshikiryoh et al. |
| 2020/0379303 | A1 | 12/2020 | Hirata et al. |
| 2021/0072601 | A1 | 3/2021 | Kambe et al. |

FOREIGN PATENT DOCUMENTS

| | | | |
|---|---|---|---|
| CN | 108139631 | A | 6/2018 |
| CN | 109254454 | A | 1/2019 |
| CN | 110196518 | A | 9/2019 |
| CN | 112015012 | A | 12/2020 |

LIQUID CRYSTAL DISPLAY PANEL AND METHOD FOR MANUFACTURING SAME, AND DISPLAY DEVICE

CROSS-REFERENCE TO RELATED APPLICATION

This application is a U.S. national stage of international application No. PCT/CN2021/143422, filed on Dec. 30, 2021, the disclosure of which is incorporated herein by references in its entirety.

TECHNICAL FIELD

The present disclosure relates to the field of display technologies, and in particular, relates to a liquid crystal display panel and a method for manufacturing the same, and a display device.

BACKGROUND OF THE INVENTION

With the development of the display technologies, liquid crystal displays have been widely used due to thin bodies, power-saving, radiation-free, and other advantages.

SUMMARY OF THE INVENTION

Embodiments of the present disclosure provide a liquid crystal display panel and a method for manufacturing the same, and a display device. The technical solutions are as follows.

According to some embodiments of the present disclosure, a liquid crystal display panel is provided. The liquid crystal display panel includes a plurality of sub-pixel regions, wherein each of the plurality of sub-pixel regions includes 4N sub-pixel sub-regions arranged in a single column, N being an integer greater than or equal to 1; and
  the liquid crystal display panel includes: a first substrate and a second substrate that are opposite to each other, and a liquid crystal layer between the first substrate and the second substrate;
  wherein a first alignment film is provided on a side, proximal to the liquid crystal layer, of the first substrate, and a second alignment film is provided on a side, proximal to the liquid crystal layer, of the second substrate;
  wherein each of the 4N sub-pixel sub-regions includes one first electrode and one second electrode, wherein one of the first electrode and the second electrode is a strip electrode, and the other of the first electrode and the second electrode is a planar electrode, wherein the strip electrode includes a plurality of electrode strips, and a slit is present between two adjacent electrode strips of the plurality of electrode strips;
  the first electrode is disposed on a side, distal from the liquid crystal layer, of the first alignment film, and the second electrode is disposed on a side, distal from the liquid crystal layer, of the second alignment film; and
  the first electrode is in contact with the first alignment film in the case that the first electrode is the strip electrode, and the second electrode is in contact with the second alignment film in the case that the second electrode is the strip electrode; and
  the 4N sub-pixel sub-regions include 2N first sub-regions and 2N second sub-regions, wherein a primary extension direction of electrode strips in the 2N first sub-regions is a first extension direction, and a primary extension direction of electrode strips in the 2N second sub-regions is a second extension direction, the first extension direction being different from the second extension direction.

In some embodiments, both the first electrode and the second electrode are transparent electrodes, and in each of the plurality of sub-pixel regions, the first electrodes in the 4N sub-pixel sub-regions are sequentially arranged in a same layer, and the second electrodes in the 4N sub-pixel sub-regions are sequentially arranged in a same layer.

In some embodiments, in each of the plurality of sub-pixel regions, the first electrodes in the 4N sub-pixel sub-regions are the strip electrodes, and the second electrodes in the 4N sub-pixel sub-regions are the planar electrodes; or the first electrodes in the 4N sub-pixel sub-regions are the planar electrodes, and the second electrodes in the 4N sub-pixel sub-regions are the strip electrodes.

In some embodiments, in each of the plurality of sub-pixel regions, the first electrodes in N first sub-regions of the 2N first sub-regions are the strip electrodes, the first electrodes in the other N first sub-regions of the 2N first sub-regions are the planar electrodes, the first electrodes in N second sub-regions of the 2N second sub-regions are the strip electrodes, and the first electrodes in the other N second sub-regions of the 2N second sub-regions are the planar electrodes; or
  all first electrodes in the 2N first sub-regions are the strip electrodes or the planar electrodes, and all first electrodes in the 2N second sub-regions are the strip electrodes or the planar electrodes.

In some embodiments, in each of the plurality of sub-pixel regions, the 4N first electrodes include: 2N strip electrodes and 2N planar electrodes, and two sequentially arranged strip electrodes and two sequentially arranged planar electrodes are alternately arranged.

In some embodiments, in each of the plurality of sub-pixel regions, 4N first electrodes include: 2N strip electrodes and 2N planar electrodes, and each of the 2N strip electrodes and each of the 2N planar electrodes are alternately arranged.

In some embodiments, in the 2N first sub-regions, major axes of liquid crystal molecules on sides, proximal to the planar electrode, of N first sub-regions extend in a first tilting direction, major axes of liquid crystal molecules on sides, proximal to the planar electrode, of the other N first sub-regions extend in a second tilting direction, wherein the first tilting direction is different from the second tilting direction, and extension directions of orthogonal projections of the first tilting direction and the second tilting direction on a target plane are parallel to the first extension direction;
  in the 2N second sub-regions, major axes of liquid crystal molecules on sides, proximal to the planar electrode, of N second sub-regions extend in a third tilting direction, major axes of liquid crystal molecules on sides, proximal to the planar electrode, of the other N second sub-regions extend in a fourth tilting direction, wherein the third tilting direction is different from the fourth tilting direction, and extension directions of orthogonal projections of the third tilting direction and the fourth tilting direction on the target plane are parallel to the second extension direction;
  wherein the target plane is a plane parallel to the liquid crystal display panel.

In some embodiments, tilting angles between major axes of liquid crystal molecules on a side, proximal to the planar electrode, of the liquid crystal layer and the target plane are greater than or equal to 87° and are less than 90°.

In some embodiments, in each of the plurality of sub-pixel regions, the 4N sub-pixel sub-regions are organized into one group, or a plurality of groups that are adjacent to each other, wherein a same group of sub-pixel sub-regions includes two first sub-regions and two second sub-regions.

In some embodiments, in the same group of sub-pixel sub-regions, the two first sub-regions and the two second sub-regions are alternately arranged: the first electrodes in the two first sub-regions are the planar electrodes, and the second electrodes in the two first sub-regions are the strip electrodes; and the first electrodes in the two second sub-regions are the strip electrodes, and the second electrodes in the two second sub-regions are the planar electrodes.

In some embodiments, in the same group of sub-pixel sub-regions, the two second sub-regions are arranged between the two first sub-regions; the first electrode in one of the two first sub-regions is the strip electrode, and the first electrode in the other of the two first sub-regions is the planar electrode; and the first electrode in one of the two second sub-regions is the strip electrode, and the first electrode in the other of the two second sub-regions is the planar electrode.

In some embodiments, N is equal to 1.

In some embodiments, the first substrate is an array substrate, the first electrode is a pixel electrode, the second substrate is a color film substrate, and the second electrode is a common electrode.

In some embodiments, the first extension direction is perpendicular to the second extension direction.

According to some embodiments of the present disclosure, a method for manufacturing a liquid crystal display panel is provided. The method includes:
  forming a first substrate including a first electrode and a first alignment film; and
  forming a second substrate including a second electrode and a second alignment film;
  disposing the first substrate and the second substrate to be opposite to each other, and forming a liquid crystal layer between the first substrate and the second substrate; wherein
  the liquid crystal display panel includes a plurality of sub-pixel regions, wherein each of the plurality of sub-pixel regions includes 2N first sub-regions and 2N second sub-regions arranged in a single column, N being an integer greater than or equal to 1; and each of sub-pixel sub-regions includes one first electrode and one second electrode, wherein
  one of the first electrode and the second electrode is a strip electrode, and the other of the first electrode and the second electrode is a planar electrode, wherein the strip electrode includes a plurality of electrode strips, and a slit is present between two adjacent electrode strips of the plurality of electrode strips; and
  the first electrode is in contact with the first alignment film in the case that the first electrode is the strip electrode, and the second electrode is in contact with the second alignment film in the case that the second electrode is the strip electrode; and
  4N sub-pixel sub-regions include 2N first sub-regions and 2N second sub-regions, wherein a primary extension direction of electrode strips in the 2N first sub-regions is a first extension direction, and a primary extension direction of electrode strips in the 2N second sub-regions is a second extension direction, the first extension direction being different from the second extension direction.

In some embodiments, upon forming the first substrate including the first electrode and the first alignment film, the method includes:

optically aligning a portion, in contact with the planar electrode, of the first alignment film, such that the portion, in contact with the planar electrode, of the first alignment film is capable of aligning liquid crystal molecules in the liquid crystal layer; and
  upon forming the second substrate including the second electrode and the second alignment film, the method includes:
  optically aligning a portion, in contact with the planar electrode, of the second alignment film, such that the portion, in contact with the planar electrode, of the second alignment film is capable of aligning the liquid crystal molecules in the liquid crystal layer.

According to some embodiments of the present disclosure, a display device is provided. The display device includes: a back light source and the liquid crystal display panel according to any one of above embodiments.

BRIEF DESCRIPTION OF THE DRAWINGS

For clearer description of the technical solutions in the embodiments of the present disclosure, the following briefly describes the accompanying drawings required for describing the embodiments. Apparently, the accompanying drawings in the following description show merely some embodiments of the present disclosure, and those of ordinary skill in the art may still derive other drawings from these accompanying drawings without any creative efforts.

DETAILED DESCRIPTION

To make the objectives, technical solutions, and advantages of the present disclosure clearer, the embodiments of the present disclosure are further described in detail hereinafter with reference to the accompanying drawings.

The liquid crystal display includes: a liquid crystal display panel, and a back light source on a back face of the liquid crystal display panel. The liquid crystal display panel includes: a first substrate and a second substrate that are opposite to each other, and a liquid crystal layer between the first substrate and the second substrate. A first alignment film is provided on a side, facing towards the liquid crystal layer, of the first substrate, and a second alignment film is provided on a side, facing towards the liquid crystal layer, of the second substrate. The first alignment film and the second alignment film are capable of aligning liquid crystal molecules in the liquid crystal layer, such that the aligned liquid crystal molecules are sequentially arranged, and the liquid crystal molecules are sequentially deflected under driving of an electric field force.

However, after the liquid crystal molecules are aligned by the first alignment film and the second alignment film, the liquid crystal display panel is prone to some undesirable phenomena, such as a dark line, in displaying, such that a display effect of the liquid crystal display panel is poor.

Figure 1:
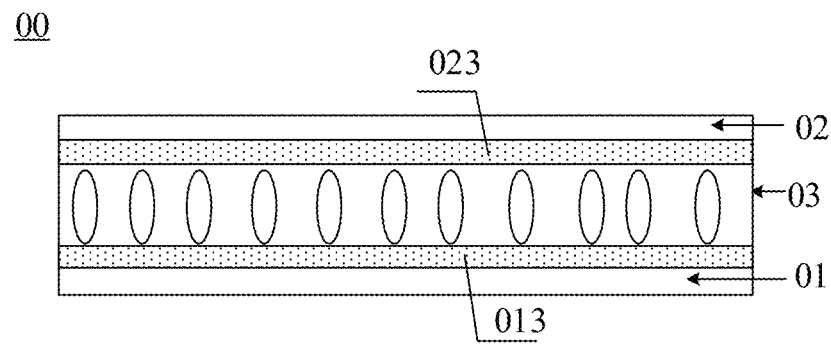
FIG. 1 is a schematic structural diagram of a liquid crystal display panel in some practices.

In some practices, referring to FIG. 1, FIG. 1 is a schematic structural diagram of a liquid crystal display panel in some practices. The liquid crystal display panel 00 generally includes: a first substrate 01 and a second substrate 02 that are opposite to each other, and a liquid crystal layer 03 between the first substrate 01 and the second substrate 02.

The first substrate 01 includes a first alignment film 013 on a side, proximal to the liquid crystal layer 03, of the first substrate 01. After the first alignment film 013 is optically aligned, the first alignment film 013 is capable of aligning liquid crystal molecules on a side, proximal to the first alignment film 013, of the liquid crystal layer.

The second substrate 02 includes a second alignment film 023 on a side, proximal to the liquid crystal layer 03, of the second substrate 02. After the second alignment film 023 is optically aligned, the second alignment film 023 is capable of aligning the liquid crystal molecules on a side, proximal to the second alignment film 023, of the liquid crystal layer.

After the first alignment film 013 and the second alignment film 023 are optically aligned, some of the liquid crystal molecules in the liquid crystal layer 03 are sequentially arranged in directions of alignment of the first alignment film 013 and the second alignment film 023, such that the liquid crystal molecules in the liquid crystal layer 03 are sequentially deflected under an action of an electric field force. As such, after the liquid crystal molecules in the liquid crystal layer 03 are sequentially deflected under the action of the electric field force, the liquid crystal molecules are sequentially arranged in a specific angle, such that light transmits the liquid crystal display panel 00.

The liquid crystal display panel 00 generally includes a plurality of sub-pixel regions 0a arranged in an array. Any two adjacent gate lines G and any two adjacent data lines D on the first substrate 01 form one sub-pixel region 0a.

Figure 2:
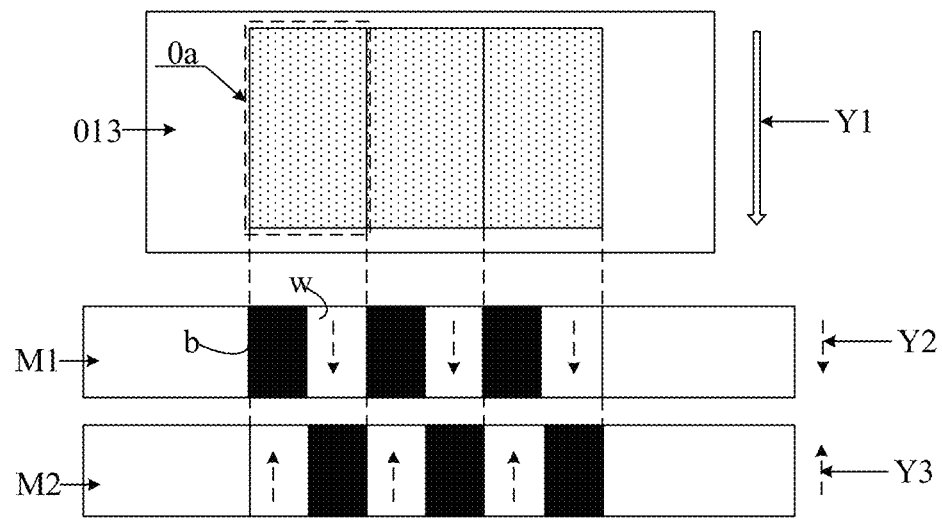
FIG. 2 is a schematic top view of an optical alignment process of a first alignment film in some practices.

Referring to FIG. 2, FIG. 2 is a schematic top view of an optical alignment process of a first alignment film in some practices. In optically aligning the first alignment film 013, a portion, within each of the plurality of sub-pixel regions 0a, of the first alignment film 013 in the first substrate 01 is divided into two liquid crystal deflection regions on the left and right.

After forming the first alignment film 013 in the first substrate 01, a first mask plate M1 and a second mask plate M2 are disposed in a direction perpendicular to the first substrate 01. Regions of the first mask plate M1 and the second mask plate M2 corresponding to one sub-pixel region 0a include light transmitting regions w and light shielding regions b, and arrangements of the light transmitting regions w and the light shielding regions b in the first mask plate M1 and the second mask plate M2 are contrary. As such, in the case that the first substrate 01 uniformly moves in a Y1 direction, ultraviolet light is irradiated on the first mask plate M1 after the portion, within the sub-pixel region 0a, of the first alignment film 013 in the first substrate 01 is located under the first mask plate M1, and the ultraviolet light is irradiated in a Y2 direction; the ultraviolet light is irradiated on the second mask plate M2 after the portion, within the sub-pixel region 0a, of the first alignment film 013 in the first substrate 01 is located under the second mask plate M2, and the ultraviolet light is irradiated in a Y3 direction.

Figure 3:
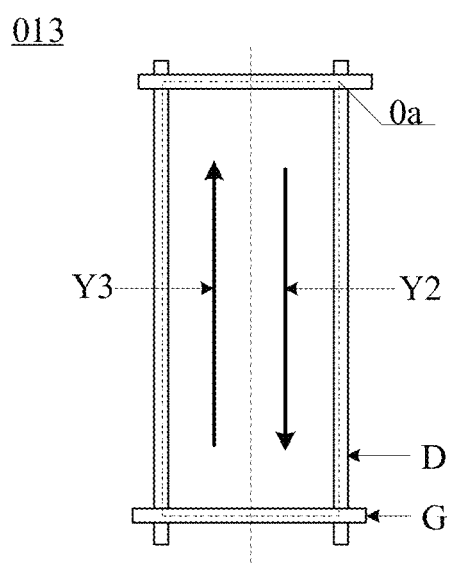
FIG. 3 is a schematic diagram of an optical alignment of a first alignment film in a sub-pixel region in some practices.

In this case, referring to FIG. 3, FIG. 3 is a schematic diagram of an optical alignment of a first alignment film in a sub-pixel region in some practices. Optical alignment directions of two liquid crystal deflection regions on the left and right of the portion, within the sub-pixel region 0a, of the first alignment film 013 in the first substrate 01 are contrary.

Figure 4:
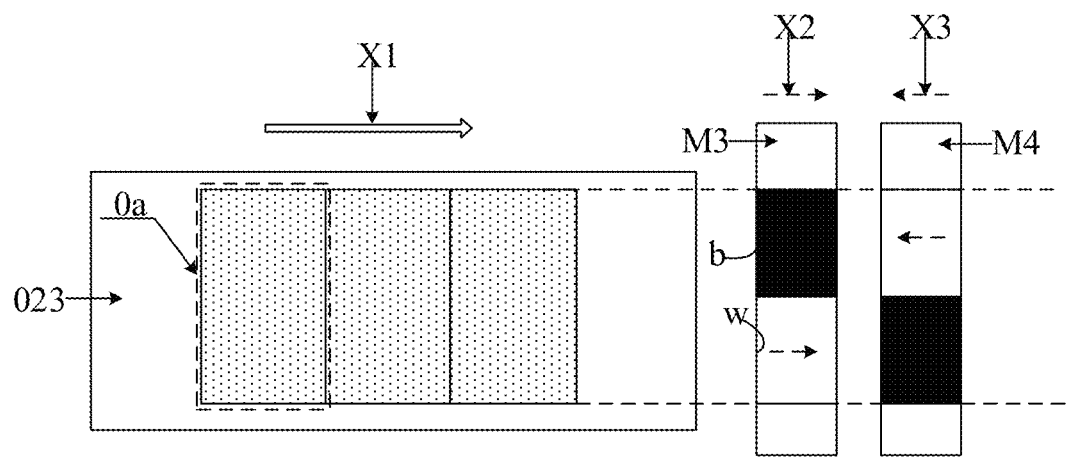
FIG. 4 is a schematic top view of an optical alignment process of a second alignment film in some practices.

Referring to FIG. 4, FIG. 4 is a schematic top view of an optical alignment process of a second alignment film in some practices. In optically aligning the second alignment film, the portion, within the sub-pixel region 0a, of the second alignment film 023 in the second substrate 02 is divided into two liquid crystal deflection regions on the upper and lower.

After forming the second alignment film 023 in the second substrate 02, a third mask plate M3 and a fourth mask plate M4 are disposed in a direction perpendicular to the second substrate 02. Regions of the third mask plate M3 and the fourth mask plate M4 corresponding to one sub-pixel region 0a include the light transmitting regions w and the light shielding regions b, and arrangements of the light transmitting regions w and the light shielding regions b in the third mask plate M3 and the fourth mask plate M4 are contrary. As such, in the case that the second substrate 02 uniformly moves in a X1 direction, the ultraviolet light is irradiated on the third mask plate M3 after the portion, within the sub-pixel region 0a, of the second alignment film 023 in the second substrate 02 is located under the third mask plate M3, and the ultraviolet light is irradiated in a X2 direction; the ultraviolet light is irradiated on the fourth mask plate M4 after the portion, within the sub-pixel region 0a, of the second alignment film 023 in the second substrate 02 is located under the fourth mask plate M4, and the ultraviolet light is irradiated in a X3 direction.

Figure 5:
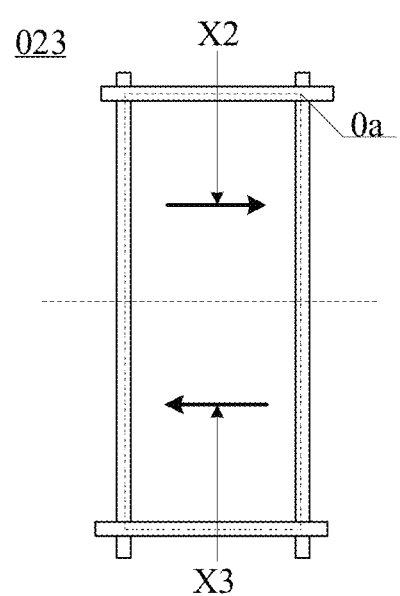
FIG. 5 is a schematic diagram of an optical alignment of a second alignment film in a sub-pixel region in some practices.

In this case, referring to FIG. 5, FIG. 5 is a schematic diagram of an optical alignment of a second alignment film in a sub-pixel region in some practices. Optical alignment directions of two liquid crystal deflection regions on the upper and lower of the portion, within the sub-pixel region 0a, of the second alignment film 023 in the second substrate 02 are contrary.

Figure 6:
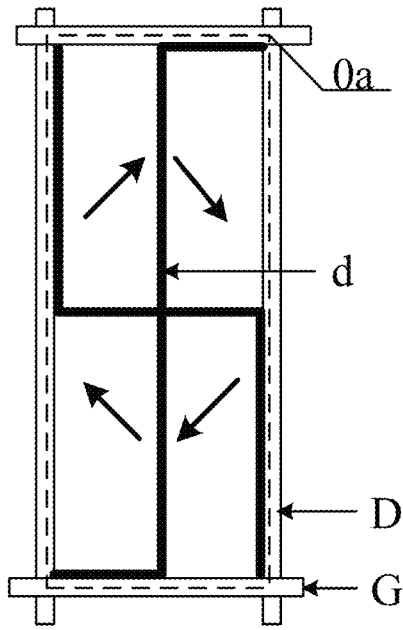
FIG. 6 is a schematic diagram of an optical alignment of a liquid crystal display panel in some practices.

Referring to FIG. 6, FIG. 6 is a schematic diagram of an optical alignment of a liquid crystal display panel in some practices. After the first substrate 01 and the second substrate 02 are disposed to be opposite to each other, and liquid crystal is introduced between the first substrate 01 and the second substrate 02 to form the liquid crystal layer 03, where the electric field force is applied to the liquid crystal display panel 00, the liquid crystal molecules in the liquid crystal layer 03 are sequentially deflected under the action of the electric field force. As the optical alignment directions of two regions on the left and right of the portion, within the sub-pixel region 0a, of the first alignment film 013 in the first substrate 01 are contrary, and the optical alignment directions of two regions on the upper and lower of the portion, within the sub-pixel region 0a, of the second alignment film 023 in the second substrate 02 are contrary, the sub-pixel region 0a in the liquid crystal display panel 00 includes four liquid crystal deflection regions, and deflection directions of liquid crystal molecules in the four liquid crystal deflection regions are different.

However, as the sub-pixel region 0a includes four liquid crystal deflection regions after the liquid crystal molecules are sequentially deflected under the action of the electric field force, and the deflection directions of the liquid crystal molecules in the four liquid crystal deflection regions are different, arrangement directions of liquid crystal molecules at the interface of any two adjacent liquid crystal deflection regions in one sub-pixel region 0a are not determined, such that dark lines d are present at the interface of any two adjacent liquid crystal deflection regions, light is not capable of transmitting the liquid crystal molecules at the dark lines d, and the dark lines d are arranged in a length direction and a width direction of the sub-pixel region 0a. As such, the dark lines are present in the length direction and the width direction of the sub-pixel region 0a, such that transmission of the liquid crystal display panel 00 is poor, and the display effect of the liquid crystal display panel 00 is further poor.

Figure 7:
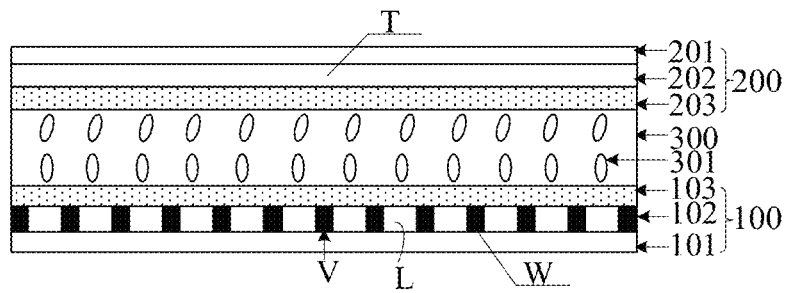
FIG. 7 is a schematic diagram of a film layer structure of a liquid crystal display panel according to some embodiments of the present disclosure.

Referring to FIG. 7, FIG. 7 is a schematic diagram of a film layer structure of a liquid crystal display panel according to some embodiments of the present disclosure. The liquid crystal display panel 000 includes: a first substrate 100 and a second substrate 200 that are opposite to each other, and a liquid crystal layer 300 between the first substrate 100 and the second substrate 200.

A first alignment film 103 is provided on a side, proximal to the liquid crystal layer 300, of the first substrate 100, and a second alignment film 203 is provided on a side, proximal to the liquid crystal layer 300, of the second substrate 200.

The liquid crystal layer 300 includes liquid crystal molecules 301. Specifically, the liquid crystal molecule 301 includes a major axis and a minor axis. For example, the liquid crystal molecule 301 is nematic liquid crystal.

Figure 8:
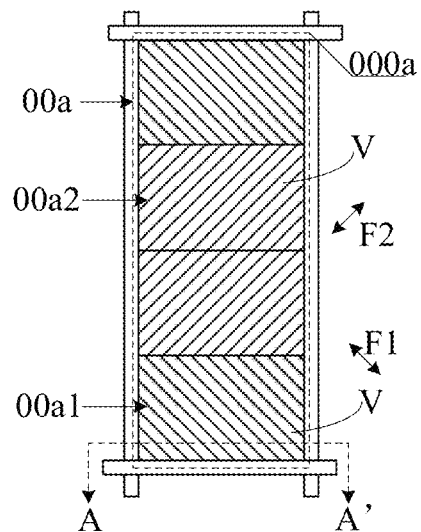
FIG. 8 is top view of one sub-pixel region in a liquid crystal display panel according to some embodiments of the present disclosure.

The liquid crystal display panel 000 includes a plurality of sub-pixel regions 000a. For clear structure of the sub-pixel region 000a, referring to FIG. 8, FIG. 8 is top view of one sub-pixel region in a liquid crystal display panel according to some embodiments of the present disclosure. A cross section view at A-A' in FIG. 8 is referred to FIG. 7. Each of the plurality of sub-pixel regions 000a in the liquid crystal display panel 000 includes 4N sub-pixel sub-regions 00a arranged in a single column. N is an integer greater than or equal to 1. As such, at least the 4N sub-pixel sub-regions 00a are not overlapped. It should be noted that FIG. 8 illustrates by taking N being equal to 1 as an example. That is, four sub-pixel sub-regions 00a are arranged in the sub-pixel region 000a shown in FIG. 8.

Each sub-pixel sub-region 00a includes one first electrode 102 and one second electrode 202. One of the first electrode 102 and the second electrode 202 is a strip electrode W, and the other of the first electrode 102 and the second electrode 202 is a planar electrode T. The strip electrode W includes a plurality of electrode strips V, and a slit L is present between two adjacent electrode strips V of the plurality of electrode strips V.

The first electrode 102 is disposed on a side, distal from the liquid crystal layer 300, of the first alignment film 103, and the second electrode 202 is disposed on a side, distal from the liquid crystal layer 300, of the second alignment film 203. That is, the first electrode 102 is a portion in the first substrate 100, and the second electrode 202 is a portion in the second substrate 200.

The first electrode 102 is in contact with the first alignment film 103 in the case that the first electrode 102 is the strip electrode W. As such, as the first alignment film 103 is disposed on a side, proximal to the liquid crystal layer 300, of the first electrode 102 in the first substrate 100, the slit L corresponding to the strip electrode W is formed on a portion, in contact with the first electrode 102, of the first alignment film 103. As such, the major axes of the liquid crystal molecules 301 in contact with the first alignment film 103 are perpendicular to the first alignment film 103 through the first alignment film 103, and the liquid crystal molecules 301 on a side, proximal to the first alignment film 103, of the liquid crystal layer 300 are sequentially arranged in an extension direction of the slit L through first alignment film 103.

The second electrode 202 is in contact with the second alignment film 203 in the case that the second electrode 202 is the strip electrode W. As such, as the second alignment film 203 is disposed on a side, proximal to the liquid crystal layer 300, of the second electrode 202 in the second substrate 200, the slit L corresponding to the strip electrode W is formed on a portion, in contact with the second electrode 202, of the second alignment film 203. As such, the major axes of the liquid crystal molecules 301 in contact with the second alignment film 203 are perpendicular to the second alignment film 203 through the second alignment film 203, and the liquid crystal molecules 301 on a side, proximal to the second alignment film 203, of the liquid crystal layer 300 are sequentially arranged in an extension direction of the slit L through second alignment film 203.

The 4N sub-pixel sub-regions 00a include 2N first sub-regions 00a1 and 2N second sub-regions 00a2. A primary extension direction of electrode strips V in the first sub-regions 00a1 is a first extension direction F1, and a primary extension direction of electrode strips V in the second sub-regions 00a2 is a second extension direction F2. The first extension direction F1 is different from the second extension direction F2.

In the embodiments of the present disclosure, the primary extension direction indicates that most or all of the electrode strips V in any sub-region are arranged in the first extension direction F1. Most of the electrode strips V in the first sub-region 00a1 are arranged in the first extension direction F1, that is, the liquid crystal molecules 301 in the slit L are sequentially arranged in the first extension direction F1. Most of the electrode strips V in the second sub-region 00a2 are arranged in the second extension direction F2, that is, the liquid crystal molecules 301 in the slit L are sequentially arranged in the second extension direction F2.

In the present disclosure, in each of the plurality of sub-pixel sub-regions 00a, in the case that one of the first electrode 102 and the second electrode 202 is the strip electrode W, and the other of the first electrode 102 and the second electrode 202 is the planar electrode T, the alignment film in contact with the planar electrode T needs to be optically aligned, such that an acute angle is present between the major axis of the liquid crystal molecule 301, proximal to the planar electrode T, in the liquid crystal layer 300 and a target plane. That is, the optically aligned alignment film is capable of aligning the liquid crystal molecules 301. The alignment film in contact with the strip electrode W is not optically aligned, such that the major axis of the liquid crystal molecule 301 on a side, most proximal to the strip electrode W, of the liquid crystal layer 300 is perpendicular to the target plane. The target plane is a plane parallel to the liquid crystal display panel 000.

In some embodiments, in the case that in each of the plurality of sub-pixel regions 000a, the first electrodes 102 in the plurality of sub-pixel sub-regions 00a are the strip electrodes W, and the second electrodes 202 in the plurality of sub-pixel sub-regions 00a are the planar electrodes T, only the second alignment film 203 needs to be optically aligned.

In some embodiments, in the case that in each of the plurality of sub-pixel regions 000a, the first electrodes 102 in N first sub-regions 00a1 of the 2N first sub-regions 00a1 are the strip electrodes W, the first electrodes 102 in the other N first sub-regions 00a1 of the 2N first sub-regions 00a1 are the planar electrodes T, the first electrodes 102 in N second sub-regions 00a2 of the 2N second sub-regions 00a2 are the strip electrodes W, and the first electrodes 102 in the other N second sub-regions 00a2 of the 2N second sub-regions 00a2 are the planar electrodes T, portions, in contact with 2N first electrodes 102 being the planar electrodes T, of the first alignment film 103 need to be optically aligned, and portions, in contact with 2N second electrodes 202 being the planar electrodes T, of the second alignment film 203 need to be optically aligned.

Figure 9:
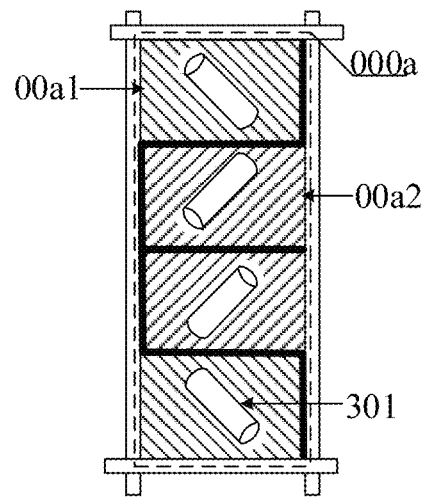
FIG. 9 is a schematic diagram of an optical alignment of a liquid crystal display panel according to some embodiments of the present disclosure.

Referring to FIG. 9, FIG. 9 is a schematic diagram of an optical alignment of a liquid crystal display panel according to some embodiments of the present disclosure. In one sub-pixel region 000a, liquid crystal molecules 301 on a side, facing towards the planar electrode, of the sub-pixel sub-regions 00a are aligned. That is, an acute angle is present between the major axis of the liquid crystal molecule 301 on a side, most proximal to the planar electrode, of each sub-pixel sub-region 00a and the target plane.

In this case, after the liquid crystal molecules 301 are aligned through the portion, in contact with the planar electrodes T, of the first alignment film 103 and/or the portion, in contact with the planar electrodes T, of the second alignment film 203, the liquid crystal molecules 301 are sequentially deflected under the action of the electric field force in the case that the liquid crystal display panel 000 applies the electric field force to the sub-pixel region 000a shown in FIG. 9, such that light transmits the liquid crystal molecules 301 in the sub-pixel region 000a.

In addition, in one sub-pixel region 000a, extension directions of the major axes of the liquid crystal molecules 301 on sides, most proximal to the planar electrode, of at least four sub-pixel sub-regions 00a are different. For example, in the case that N is equal to 1, one sub-pixel region 000a includes four sub-pixel sub-regions 00a, and extension directions of the major axes of the liquid crystal molecules 301 on the sides, most proximal to the planar electrode, of the sub-pixel regions 000a in the four sub-pixel sub-regions 00a are different. In the case that N is greater than 1, in the 4N sub-pixel sub-regions 00a, numbers of sub-pixel sub-regions in which the major axes of the liquid crystal molecules 301 extend in a same direction are equal. As such, after transmitting the plurality of sub-pixel sub-regions 00a, the light exits in different directions, such that the liquid crystal display panel 000 displays screens with less color difference in different directions, and the light exiting in different directions of the liquid crystal display panel 000 causes a wide range of viewing angles of the liquid crystal display panel 000. The extension direction of the major axis of the liquid crystal molecule 301 is a direction of the major axis of the liquid crystal molecule 301.

In the embodiments of the present disclosure, the 4N sub-pixel sub-regions 00a in the sub-pixel region 000a are arranged in a single column, the 4N sub-pixel sub-regions 00a are organized into N groups that are adjacent to each other, and a same group of sub-pixel sub-regions 00a includes two first sub-regions 00a1 and two second sub-regions 00a2. Thus, as the alignment directions of the liquid crystal molecules 301 in two adjacent sub-pixel sub-regions 00a are different, the dark lines generated at the interface are merely arranged in one direction. For example, as shown in FIG. 9, assuming that the sub-pixel region 000a is in a rectangular shape, N is equal to 1, and two first sub-regions 00a1 and two second sub-regions 00a2 are arranged in the single column, the dark lines generated at the interface from the two adjacent sub-pixel sub-regions are merely perpendicular to a long edge of the sub-pixel region 000a. That is, the dark lines generated at the interface from the two adjacent sub-pixel sub-regions are merely arranged in a short edge of the sub-pixel region 000a and are not arranged in the long edge of the sub-pixel region 000a. Therefore, the transmission of the liquid crystal display panel 000 is efficiently improved. In addition, the uniformity of the luminance of the light from the sub-pixel regions 000a is great, such that the display effect of the liquid crystal display panel 000 is great.

In summary, the liquid crystal display panel provided in the embodiments of the present disclosure includes: a first substrate and a second substrate that are opposite to each other, and a liquid crystal layer between the first substrate and the second substrate. The liquid crystal display panel includes a plurality of sub-pixel regions. Each of the plurality of sub-pixel regions includes 4N sub-pixel sub-regions arranged in a single column, and the 4N sub-pixel sub-regions are organized into one group, or a plurality of groups that are adjacent to each other. A same group of sub-pixel sub-regions includes two first sub-regions and two second sub-regions. N is an integer greater than or equal to 1. As such, alignment of liquid crystal molecules in two adjacent sub-pixel sub-regions is different, and dark lines generated at an interface are arranged in one direction. Therefore, transmission of the liquid crystal display panel is efficiently improved. In addition, uniformity of luminance of light from the sub-pixel regions is great, such that the display effect of the liquid crystal display panel is great.

Figure 10:
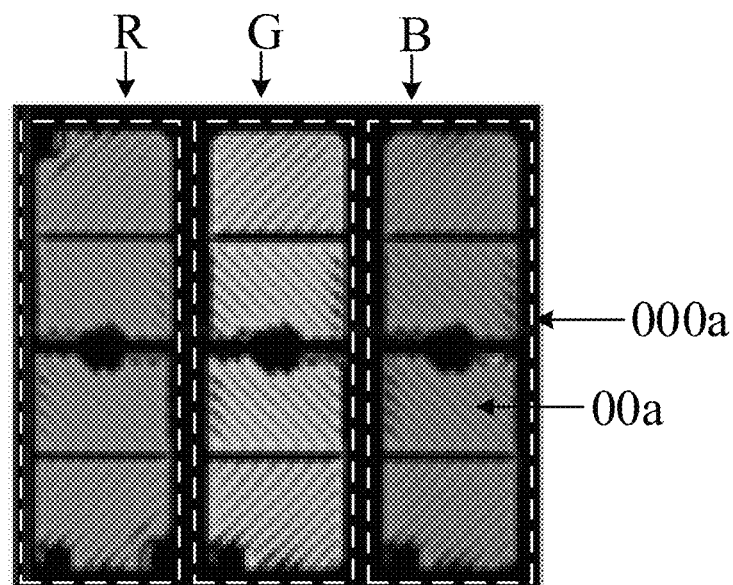
FIG. 10 is schematic diagram of a display of a local of a liquid crystal display panel according to some embodiments of the present disclosure.

It should be noted that, referring to FIG. 10, FIG. 10 is schematic diagram of a display of a local of a liquid crystal display panel according to some embodiments of the present disclosure. In the case that the liquid crystal display panel 000 is in a L255 display mode, the 4N sub-pixel sub-regions 00a in the sub-pixel region 000a are viewable. The L255 display mode is a display mode in which the transmission of the sub-pixel region 000a in the liquid crystal display panel 000 is maximum. Each sub-pixel region 000a corresponds to one color of light, and colors of light from four sub-pixel sub-regions 00a in each sub-pixel region 000a are same. For example, a sub-pixel region 000a displaying a color of red, a sub-pixel region 000a displaying a color of green, and a sub-pixel region 000a displaying a color of blue are combined randomly to enrich the color of the liquid crystal display panel.

Figure 11:
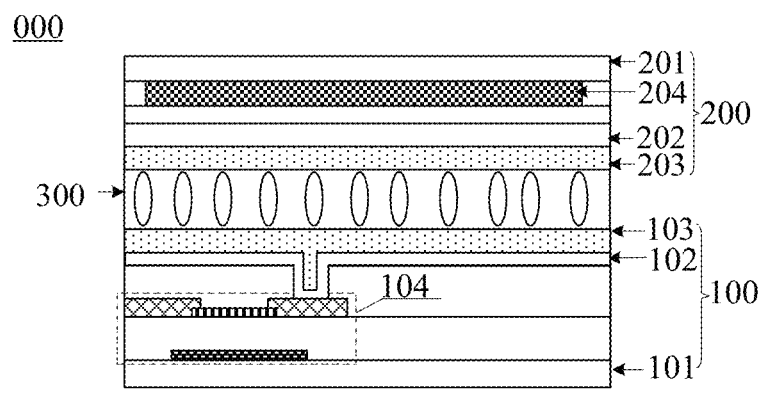
FIG. 11 is schematic diagram of a film layer of another liquid crystal display panel according to some embodiments of the present disclosure.

In the embodiments of the present disclosure, as shown in FIG. 11. FIG. 11 is schematic diagram of a film layer of another liquid crystal display panel according to some embodiments of the present disclosure. In the liquid crystal display panel 000, the first substrate 100 is an array substrate, the first electrode 102 is a pixel electrode, the second substrate 200 is a color film substrate, and the second electrode 202 is a common electrode.

In some embodiments, the array substrate includes: a first base substrate 101, a thin-film transistor 104 on a side, proximal to the color film substrate, of the first base substrate 101, the pixel electrode electronically connected to the thin-film transistor 104, and a first alignment film 103 on a side, facing away from the first base substrate 101, of the pixel electrode.

The color film substrate includes: a second base substrate 201, the common electrode on a side, proximal to the array substrate, of the second base substrate 201, a color filter layer 204 on a side, facing away from the second base substrate 201, of the common electrode, and a second alignment film 203 on a side, facing away from the second base substrate 201, of the color filter layer 204.

In the present disclosure, each thin-film transistor 104 and the pixel electrode connected to the thin-film transistor 104 are disposed on one sub-pixel region 000a. The array substrate 100 is integrated with a plurality of data lines D (not shown in FIG. 9) and a plurality of gate lines G (not shown in FIG. 9), any two adjacent data lines D and any two adjacent gate lines G form one sub-pixel region 000a. The gate line G is electronically connected to gates of the thin-film transistors 104 in one row of sub-pixel regions 000a, the data line D is electronically connected to first electrodes of the thin-film transistors 104 in one column of sub-pixel regions 000a, and second electrodes of the thin-film transistors 104 are electronically connected to the pixel electrode 202. After corresponding electrical signals are loaded on the gate line G and the data line D, the pixel electrode is controlled to load the pixel voltage, such that a voltage difference is present between the pixel electrode and the common electrode. As such, the electric field force capable of driving the liquid crystal to deflect is formed between the pixel electrode and the common electrode.

The color filter layer 204 includes a color filter in each sub-pixel region 000a. The color filters in the second substrate 200 include: a red filter, a green filter, and a blue filter. Light with different colors are filtered by the color filter layer 204, such that the liquid crystal display panel is capable of displaying color screens.

In the embodiments of the present disclosure, as shown in FIG. 11, both the first electrode 102 and the second electrode 202 in the liquid crystal display panel 000 are transparent electrodes. As such, the light is capable of transmitting the liquid crystal display panel 000. In each sub-pixel region 000a, the first electrodes 102 in the sub-pixel sub-regions 00a are sequentially arranged in a same layer, and second electrodes 202 in the sub-pixel sub-regions 00a are sequentially arranged in a same layer. That is, the first electrodes 102 in the same sub-pixel region 000a are formed by one patterning process and are connected, and the second electrodes 202 in the same sub-pixel region 000a are formed by one patterning process and are connected. The one patterning process includes: photoresist coating, exposing, developing, etching, and photoresist removing.

In this case, the first electrodes 102 in each sub-pixel sub-region 00a are driven by one thin-film transistors 104 to form the electric field force between the first electrode 102 and the second electrode 202.

In the embodiments of the present disclosure, the planar electrodes T and the strip electrodes W in the first electrodes 102 and the second electrodes 202 in the plurality of sub-pixel sub-regions 00a in one sub-pixel region 000a are disposed in many arrangements, and thus, the embodiments of the present disclosure illustrate in following two types of optional embodiments.

In first embodiments, in each sub-pixel region 000a, the first electrodes 102 in the sub-pixel sub-regions 00a are strip electrodes W, and second electrodes 202 in the sub-pixel sub-regions 00a are planar electrodes T. Or, the first electrodes 102 in the sub-pixel sub-regions 00a are the planar electrodes T, and the second electrodes 202 in the sub-pixel sub-regions 00a are the strip electrodes W. As such, the alignment film in contact with the planar electrode T needs to be optically aligned, and the liquid crystal molecules 301, proximal to the planar electrode T, in the liquid crystal layer 300 are aligned through the alignment film. That is, an acute angle is present between the major axis of the liquid crystal molecule 301 and a plane of the optically aligned alignment film. The alignment film in contact with the strip electrode W is not optically aligned, and the liquid crystal molecules 301 on a side, proximal to the strip electrode W, of the liquid crystal layer 300 are not aligned through the alignment film. As the slit is present between any two adjacent electrode strips of the plurality of electrode strips in the strip electrodes W, the major axis of the liquid crystal molecule 301 is perpendicular to the plane of the alignment film.

Figure 12:
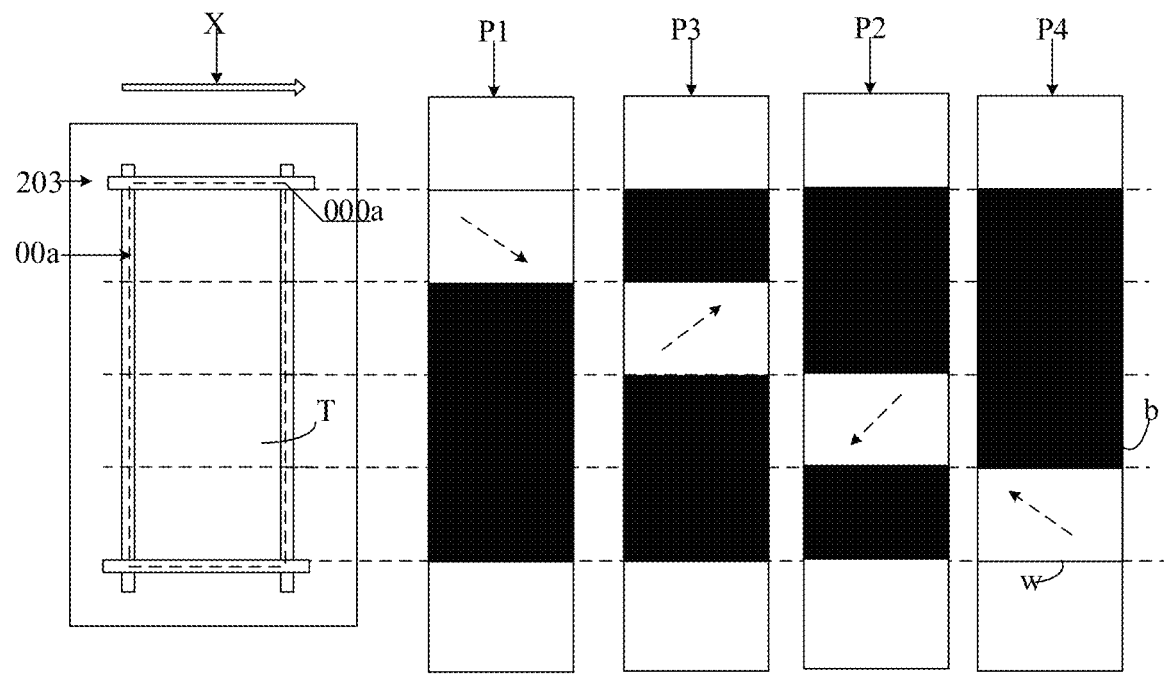
FIG. 12 is a schematic diagram of an alignment process of a second alignment film according to some embodiments of the present disclosure.

Taking optically aligning the second alignment film 203 as an example, referring to FIG. 12. FIG. 12 is a schematic diagram of an alignment process of a second alignment film according to some embodiments of the present disclosure. The second alignment films 203 in the sub-pixel sub-regions 00a are aligned, and alignment directions of the second alignment films 203 in the sub-pixel sub-regions 00a are different.

For example, in optically aligning the second alignment film 203, the second substrate 200 including the second alignment film 203 uniformly moves in the X direction. In the case that the second substrate 200 moves to a position under a first mask plate P1, and a light transmitting region w of the first mask plate P1 is overlapped with one sub-pixel sub-region 00a in the second alignment film 203, the ultraviolet light is irradiated on the first mask plate P1, such that the one sub-pixel sub-region 00a in the second alignment film 203 is irradiated with the ultraviolet light, and the optical alignment of the one sub-pixel sub-region 00a in the second alignment film 203 is achieved. In the case that the first substrate 100 moves to a position under a third mask plate P3, and a light transmitting region w of the third mask plate P3 is overlapped with the other sub-pixel sub-region 00a in the second alignment film 203, ultraviolet light is irradiated on the third mask plate P3, such that the other sub-pixel sub-region 00a in the second alignment film 203 is irradiated with the ultraviolet light, and the optical alignment of the other sub-pixel sub-region 00a in the second alignment film 203 is achieved. Then, in the case that the first substrate 100 moves to a position under a second mask plate P2, and a light transmitting region w of the second mask plate P2 is overlapped with another sub-pixel sub-region 00a in the second alignment film 203, ultraviolet light is irradiated on the second mask plate P2, such that the another sub-pixel sub-region 00a in the second alignment film 203 is irradiated with the ultraviolet light, and the optical alignment of another sub-pixel sub-region 00a in the second alignment film 203 is achieved. Eventually, in the case that the first substrate 100 moves to a position under a fourth mask plate P4, and a light transmitting region w of the fourth mask plate P4 is overlapped with further another sub-pixel sub-region 00a in the second alignment film 203, ultraviolet light is irradiated on the fourth mask plate P4, such that the further another sub-pixel sub-region 00a in the second alignment film 203 is irradiated with the ultraviolet light, and the optical alignment of the further another sub-pixel sub-region 00a in the second alignment film 203 is achieved.

The ultraviolet light irradiated on the mask plate is linearly polarized light. After first linearly polarized light is acquired by polarizing light from an ultraviolet light source above the first mask plate P1, the first linearly polarized light needs to obliquely irradiate the light transmitting region w of the first mask plate P1. A direction of an orthogonal projection of an irradiation direction of irradiating the first mask plate P1 by the first linearly polarized light on the target plane is an arrow direction in the light transmitting region w of the first mask plate P1 in FIG. 12, and the arrow direction is parallel to the first extension direction F1. In addition, after the first linearly polarized light is irradiated on the second alignment film 203 through the light transmitting region, an orthogonal projection of a polarized axis of the first linearly polarized light irradiated on the second alignment film 203 on the target plane is parallel to the first extension direction F1.

After second linearly polarized light is acquired by polarizing light from an ultraviolet light source above the second mask plate P2, the second linearly polarized light needs to obliquely irradiate the light transmitting region w of the second mask plate P2. A direction of an orthogonal projection of an irradiation direction of irradiating the second mask plate P2 by the second linearly polarized light on the target plane is an arrow direction in the light transmitting region w of the second mask plate P2 in FIG. 12, and the arrow direction is parallel to the second extension direction F2. In addition, after the second linearly polarized light is irradiated on the second alignment film 203 through the light transmitting region, an orthogonal projection of a polarized axis of the second linearly polarized light irradiated on the second alignment film 203 on the target plane is parallel to the second extension direction F2.

After third linearly polarized light is acquired by polarizing light from an ultraviolet light source above the third mask plate P3, the third linearly polarized light needs to obliquely irradiate the light transmitting region w of the third mask plate P3. A direction of an orthogonal projection of an irradiation direction of irradiating the third mask plate P3 by the third linearly polarized light on the target plane is an arrow direction in the light transmitting region w of the third mask plate P3 in FIG. 12, and the arrow direction is parallel to the second extension direction F2. In addition, after the third linearly polarized light is irradiated on the second alignment film 203 through the light transmitting region, an orthogonal projection of a polarized axis of the third linearly polarized light irradiated on the second alignment film 203 on the target plane is parallel to the second extension direction F2.

After fourth linearly polarized light is acquired by polarizing light from an ultraviolet light source above the fourth mask plate P4, the fourth linearly polarized light needs to obliquely irradiate the light transmitting region w of the fourth mask plate P4. A direction of an orthogonal projection of an irradiation direction of irradiating the fourth mask plate P4 by the fourth linearly polarized light on the target plane is an arrow direction in the light transmitting region w of the fourth mask plate P4 in FIG. 12, and the arrow direction is parallel to the first extension direction F1. In addition, after the fourth linearly polarized light is irradiated on the second alignment film 203 through the light transmitting region, an orthogonal projection of a polarized axis of the fourth linearly polarized light irradiated on the second alignment film 203 on the target plane is parallel to the first extension direction F1.

It should be noted that in the case that a polarized direction of the ultraviolet light is parallel to a straight line, an axis of the straight line is the polarized axis of the ultraviolet light.

In this case, a first portion optically aligned by the first mask plate P1 and a fourth portion optically aligned by the fourth mask plate P4 in the second alignment film 203 are capable of aligning the liquid crystal molecules 301. In addition, major axes of the liquid crystal molecules 301 in contact with the first portion and major axes of the liquid crystal molecules 301 in contact with the fourth portion extend in different tilting directions. Orthogonal projections of the major axes of the liquid crystal molecules 301 in contact with the first portion and the major axes of the liquid crystal molecules 301 in contact with the fourth portion on the second alignment film 203 are parallel to the first extension direction F1.

A second portion optically aligned by the second mask plate P2 and a third portion optically aligned by the third mask plate P3 in the second alignment film 203 are capable of aligning the liquid crystal molecules 301. In addition, major axes of the liquid crystal molecules 301 in contact with the second portion and major axes of the liquid crystal molecules 301 in contact with the third portion extend in different tilting directions. Orthogonal projections of the major axes of the liquid crystal molecules 301 in contact with the third portion and the major axes of the liquid crystal molecules 301 in contact with the second portion on the second alignment film 203 are parallel to the second extension direction F2.

Figure 13:
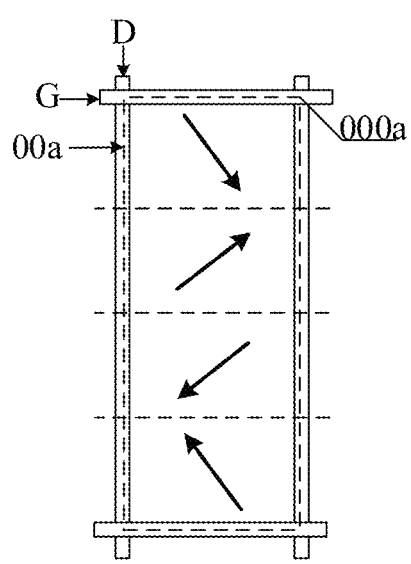
FIG. 13 is a schematic diagram of an optical alignment of a second alignment film according to some embodiments of the present disclosure.

In the embodiments of the present disclosure, referring to FIG. 13, FIG. 13 is a schematic diagram of an optical alignment of a second alignment film according to some embodiments of the present disclosure. In FIG. 13, arrows in the sub-pixel sub-regions 00a represent alignment directions of the second alignment film 203, that is, liquid crystal molecules 301 in contact with the second alignment film 203 are deflected in the arrow directions. The alignment directions of the second alignment films 203 in sub-pixel sub-regions 00a respectively correspond to irradiation directions of ultraviolet light irradiated on the first mask plate P1, the second mask plate P2, the third mask plate P3, and the fourth mask plate P4. As such, light from one sub-pixel region 000a is in four different directions, such that the liquid crystal display panel displays screens with less color difference in four different directions.

Figure 14:
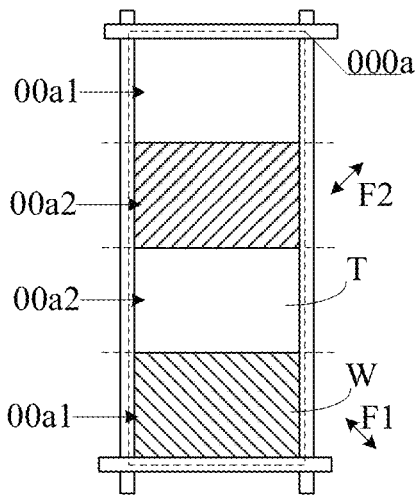
FIG. 14 is a schematic diagram of a first electrode according to some embodiments of the present disclosure.
Figure 15:
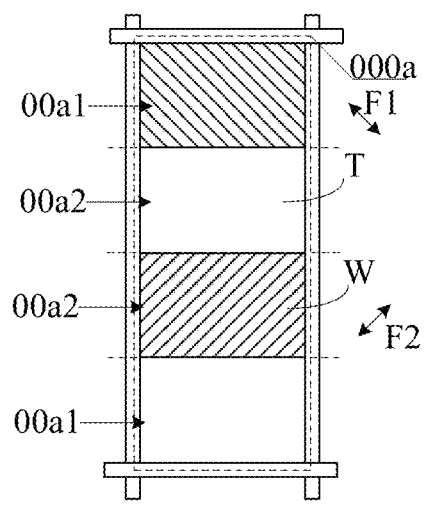
FIG. 15 is a schematic diagram of a second electrode according to some embodiments of the present disclosure.

In second embodiments, referring to FIG. 14 and FIG. 15, FIG. 14 is a schematic diagram of a first electrode according to some embodiments of the present disclosure, and FIG. 15 is a schematic diagram of a second electrode according to some embodiments of the present disclosure. Both FIG. 14 and FIG. 15 are top views at a side from the second substrate 200 to the first substrate 100. In each sub-pixel region 000a, first electrodes 102 in N first sub-regions 00a1 of the 2N first sub-regions 00a1 are strip electrodes W, first electrodes 102 in the other N first sub-regions 00a1 of the 2N first sub-regions 00a1 are planar electrodes T, first electrodes 102 in N second sub-regions 00a2 of the 2N second sub-regions 00a2 are strip electrodes W, and first electrodes 102 in the other N second sub-regions 00a2 of the 2N second sub-regions 00a2 are planar electrodes T. In some embodiments, all first electrodes 102 in the 2N first sub-regions 00a1 are strip electrodes W or planar electrodes T, and all first electrodes 102 in the 2N second sub-regions 00a2 are strip electrodes W or planar electrodes T.

As the 4N first electrodes 102 in each sub-pixel region 000a are arranged in many manners, the embodiments of the present disclosure merely illustrate in following two cases.

In a first case, in each sub-pixel region 000a, the 4N first electrodes 102 include 2N strip electrodes W and 2N planar electrodes T, and each strip electrode W and each planar electrode T are alternately arranged. For example, in the case that N is equal to 1, each strip electrode W and each planar electrode T in four first electrodes 102 in one sub-pixel region 000a are alternately arranged as shown in FIG. 14, and each strip electrode W and each planar electrode T in four second electrodes 102 in one sub-pixel region 000a are alternately arranged as shown in FIG. 15.

It should be noted that, in the case that each strip electrode W and each planar electrode T are alternately arranged, as the liquid crystal molecules 301 have a domino effect under the action of the electric field force, the liquid crystal molecules 301 on a side of the planar electrode T are capable of driving liquid crystal molecules 301, on the same side, of the adjacent strip electrode W in one electrode, such that the liquid crystal molecules 301 quickly rotate to an assigned position, and a response speed of the liquid crystal display panel is improved.

In the first sub-region 00a1 in the sub-pixel region 000a, in the case that the first electrode 102 in one first sub-region 00a1 is the strip electrode W, the second electrode 202 in the first sub-region 00a1 is the planar electrode T; in the case that the first electrode 102 in the other first sub-region 00a1 is the planar electrode T, the second electrode 202 in the first sub-region 00a1 is the strip electrode W. In the second sub-region 00a2 in the sub-pixel region 000a, in the case that the first electrode 102 in one second sub-region 00a2 is the strip electrode W, the second electrode 202 in the second sub-region 00a2 is the planar electrode T; in the case that the first electrode 102 in the other second sub-region 00a2 is the planar electrode T, the second electrode 202 in the second sub-region 00a2 is the strip electrode W.

In this case, only a portion, in contact with the first electrode 102 being the planar electrode T, of the first alignment film 103 is optically aligned, and only a portion, in contact with the second electrode 202 being the planar electrode T, of the second alignment film 203 is optically aligned. As such, the liquid crystal molecules 301 on a side, proximal to the planar electrode T, of the liquid crystal layer 300 are aligned through the portion, in contact with the planar electrode T, of the alignment film. That is, an acute angle is present between the major axis of the liquid crystal molecule 301 and the plane of the alignment film. As the slit is present between any two adjacent electrode strips of the plurality of electrode strips in the strip electrodes W, the major axes of the liquid crystal molecules 301 on a side, proximal to the strip electrode W, of the liquid crystal layer 300 are perpendicular to the plane of the alignment film.

Figure 16:
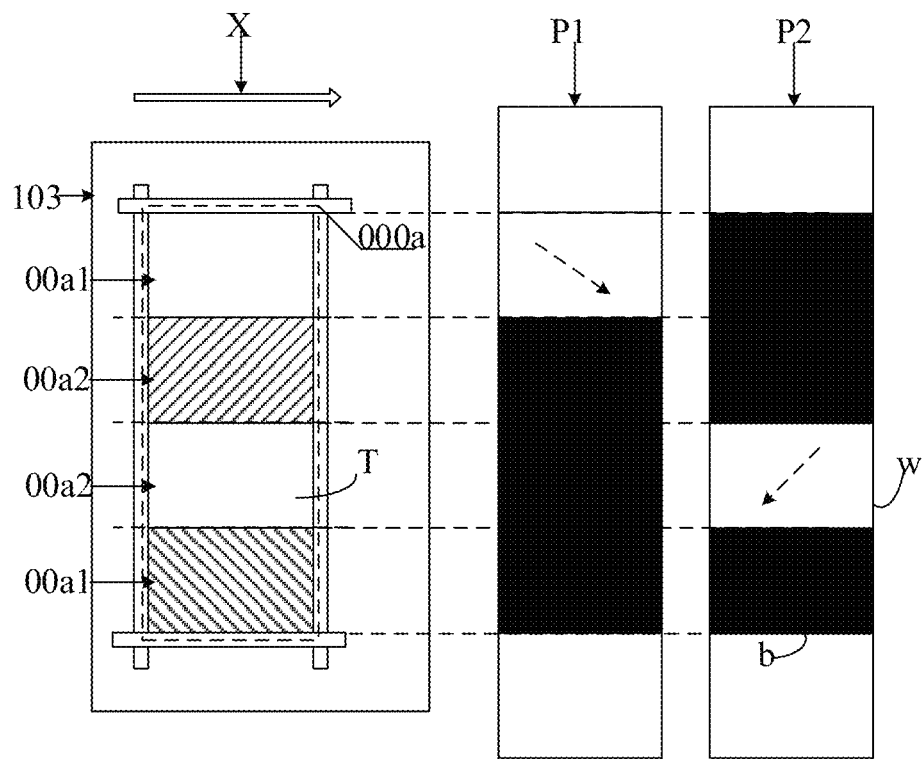
FIG. 16 is a schematic diagram of an alignment process of a first alignment film in contact with the first electrode shown in FIG. 14.

In the embodiments of the present disclosure, referring to FIG. 16, FIG. 16 is a schematic diagram of an alignment process of a first alignment film in contact with the first electrode shown in FIG. 14. The first alignment films 103, in contact with the planar electrode T, of two sub-pixel sub-regions 00a are aligned, and alignment directions of the first alignment films 103, in contact with the planar electrode T, of the sub-pixel sub-regions 00a are different.

In some embodiments, in optically aligning the first alignment films 103, in contact with the planar electrode T, of the sub-pixel sub-regions 00a, the first substrate 100 including the first alignment film 103 uniformly moves in the X direction. In the case that the first substrate 100 moves to a position under a first mask plate P1, and a light transmitting region w of the first mask plate P1 is overlapped with the first alignment film 103, in contact with the planar electrode T, in the sub-pixel sub-region 00a, ultraviolet light is irradiated on the first mask plate P1, such that the first alignment film 103, in contact with the planar electrode T, in the sub-pixel sub-region 00a is irradiated with the ultraviolet light, and the optical alignment of the first alignment film 103, in contact with the planar electrode T, in the sub-pixel sub-region 00a is achieved. Eventually, in the case that the first substrate 100 moves to a position under a second mask plate P2, and a light transmitting region w of the second mask plate P2 is overlapped with the first alignment film 103, in contact with the planar electrode T, in another sub-pixel sub-region 00a, ultraviolet light is irradiated on the second mask plate P2, such that the first alignment film 103, in contact with the planar electrode T, in another sub-pixel sub-region 00a is irradiated with the ultraviolet light, and the optical alignment of the first alignment film 103, in contact with the planar electrode T, in another sub-pixel sub-region 00a is achieved.

The ultraviolet light irradiated on the mask plate is polarized light. After first linearly polarized light is acquired by polarizing light from an ultraviolet light source above the first mask plate P1, the first linearly polarized light needs to obliquely irradiate the light transmitting region w of the first mask plate P1. A direction of an orthogonal projection of an irradiation direction of irradiating the first mask plate P1 by the first linearly polarized light on the target plane is an arrow direction in the light transmitting region w of the first mask plate P1 in FIG. 12, and the arrow direction is parallel to the first extension direction F1. In addition, after the first linearly polarized light is irradiated on the second alignment film 203 through the light transmitting region, an orthogonal projection of a polarized axis of the first linearly polarized light irradiated on the second alignment film 203 on the target plane is parallel to the first extension direction F1.

After second linearly polarized light is acquired by polarizing light from an ultraviolet light source above the second mask plate P2, the second linearly polarized light needs to obliquely irradiate the light transmitting region w of the second mask plate P2. A direction of an orthogonal projection of an irradiation direction of irradiating the second mask plate P2 by the second linearly polarized light on the target plane is an arrow direction in the light transmitting region w of the second mask plate P2 in FIG. 16, and the arrow direction is parallel to the second extension direction F2. In addition, after the second linearly polarized light is irradiated on the second alignment film 203 through the light transmitting region, an orthogonal projection of a polarized axis of the second linearly polarized light irradiated on the second alignment film 203 on the target plane is parallel to the second extension direction F2.

Figure 17:
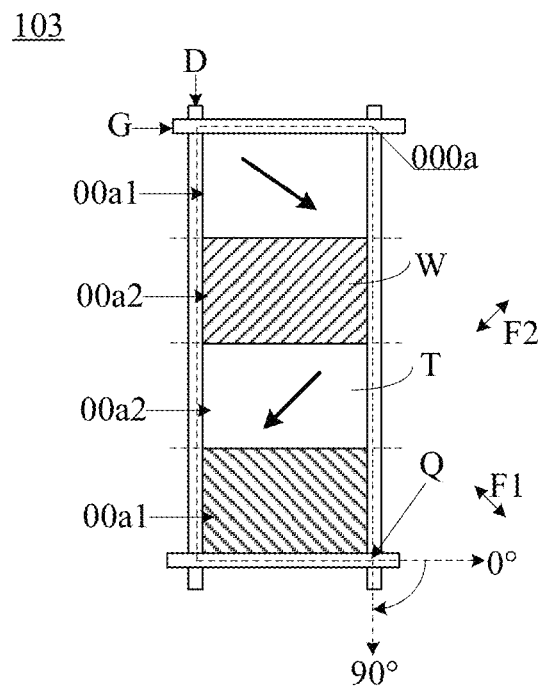
FIG. 17 is a schematic diagram of an optical alignment of the first alignment film shown in FIG. 16.

In this case, referring to FIG. 17, FIG. 17 is a schematic diagram of an optical alignment of the first alignment film shown in FIG. 16. In FIG. 17, arrows in the sub-pixel sub-regions 00a represent alignment directions of the first alignment film 103, that is, liquid crystal molecules 301 in contact with the first alignment film 103 are deflected in the arrow directions. The optical alignment direction of the first alignment film 103, in contact with the planar electrode T, in the sub-pixel sub-region 00a is the same as a direction of the ultraviolet light irradiated on the first mask plate P1, and an optical alignment direction of the first alignment film 103, in contact with the planar electrode T, in another sub-pixel sub-region 00a is the same as a direction of the ultraviolet light irradiated on the second mask plate P2.

Figure 18:
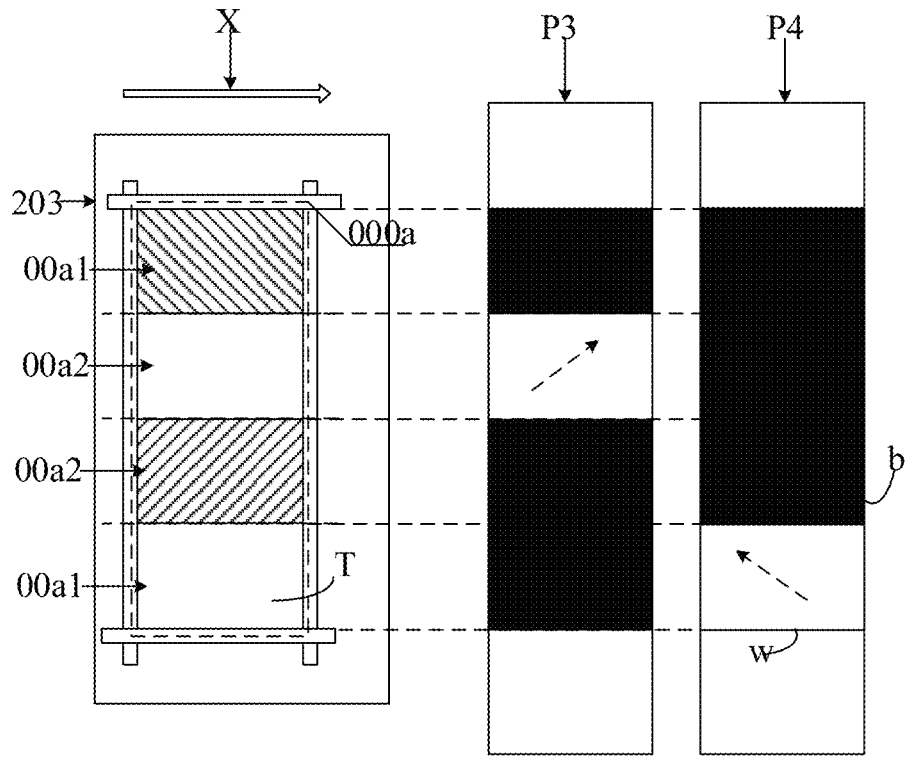
FIG. 18 is a schematic diagram of an alignment process of a second alignment film in contact with the second electrode shown in FIG. 15.

In the embodiments of the present disclosure, referring to FIG. 18, FIG. 18 is a schematic diagram of an alignment process of a second alignment film in contact with the second electrode shown in FIG. 15. The second alignment films 203, in contact with the planar electrodes T, in two sub-pixel sub-regions 00a are aligned, and alignment directions of the second alignment films 203, in contact with the planar electrodes T, in the sub-pixel sub-regions 00a are different.

In some embodiments, in optically aligning the second alignment films 203, in contact with the planar electrodes T, in the sub-pixel sub-regions 00a, the second substrate 200 including the second alignment film 203 uniformly moves in the X direction. In the case that the second substrate 200 moves to a position under a third mask plate P3, and a light transmitting region w of the third mask plate P3 is overlapped with the second alignment film 203, in contact with the planar electrode T, in the sub-pixel sub-region 00a, ultraviolet light is irradiated on the third mask plate P3, such that the second alignment film 203, in contact with the planar electrode T, in the sub-pixel sub-region 00a is irradiated with the ultraviolet light, and the optical alignment of the second alignment film 203, in contact with the planar electrode T, in the sub-pixel sub-region 00a is achieved. Eventually, in the case that the second substrate 200 moves to a position under a fourth mask plate P4, and a light transmitting region w of the fourth mask plate P4 is overlapped with the second alignment film 203, in contact with the planar electrode T, in another sub-pixel sub-region 00a, ultraviolet light is irradiated on the fourth mask plate P4, such that the second alignment film 203, in contact with the planar electrode T, in another sub-pixel sub-region 00a is irradiated with the ultraviolet light, and the optical alignment of the second alignment film 203, in contact with the planar electrode T, in another sub-pixel sub-region 00a is achieved.

The ultraviolet light irradiated on the mask plate is linearly polarized light. After third linearly polarized light is acquired by polarizing light from an ultraviolet light source above the third mask plate P3, the third linearly polarized light needs to obliquely irradiate the light transmitting region w of the third mask plate P3. A direction of an orthogonal projection of an irradiation direction of irradiating the third mask plate P3 by the third linearly polarized light on the target plane is an arrow direction in the light transmitting region w of the third mask plate P3 in FIG. 18, and the arrow direction is parallel to the second extension direction F2. In addition, after the third linearly polarized light is irradiated on the second alignment film 203 through the light transmitting region, an orthogonal projection of a polarized axis of the third linearly polarized light irradiated on the second alignment film 203 on the target plane is parallel to the second extension direction F2.

After fourth linearly polarized light is acquired by polarizing light from an ultraviolet light source above the fourth mask plate P4, the fourth linearly polarized light needs to obliquely irradiate the light transmitting region w of the fourth mask plate P4. A direction of an orthogonal projection of an irradiation direction of irradiating the fourth mask plate P4 by the fourth linearly polarized light on the target plane is an arrow direction in the light transmitting region w of the fourth mask plate P4 in FIG. 18, and the arrow direction is parallel to the first extension direction F1. In addition, after the fourth linearly polarized light is irradiated on the second alignment film 203 through the light transmitting region, an orthogonal projection of a polarized axis of the fourth linearly polarized light irradiated on the second alignment film 203 on the target plane is parallel to the first extension direction F1.

Figure 19:
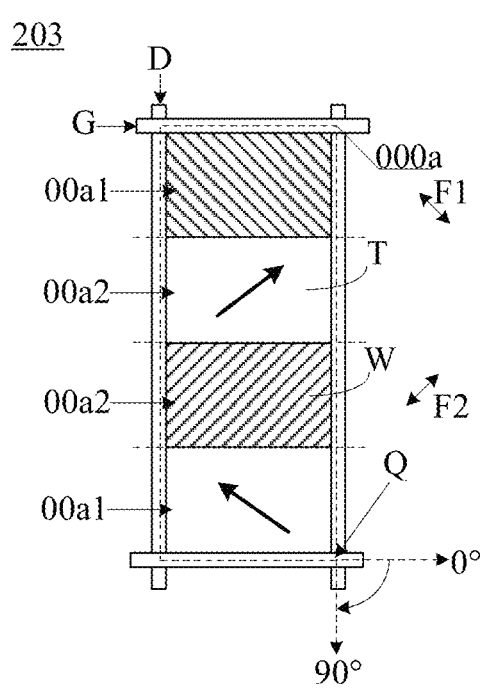
FIG. 19 is a schematic diagram of an optical alignment of the second alignment film shown in FIG. 18.

In this case, referring to FIG. 19, FIG. 19 is a schematic diagram of an optical alignment of the second alignment film shown in FIG. 18. In FIG. 19, arrows in the sub-pixel sub-regions 00a represent alignment directions of the second alignment film 203, that is, liquid crystal molecules 301 in contact with the second alignment film 203 are deflected in the arrow directions. The optical alignment direction of the second alignment film 203, in contact with the planar electrode T, in the sub-pixel sub-region 00a is the same as a direction of the ultraviolet light irradiated on the third mask plate P3, and an optical alignment direction of the second alignment film 203, in contact with the planar electrode T, in another sub-pixel sub-region 00a is the same as a direction of the ultraviolet light irradiated on the fourth mask plate P4.

Figure 20:
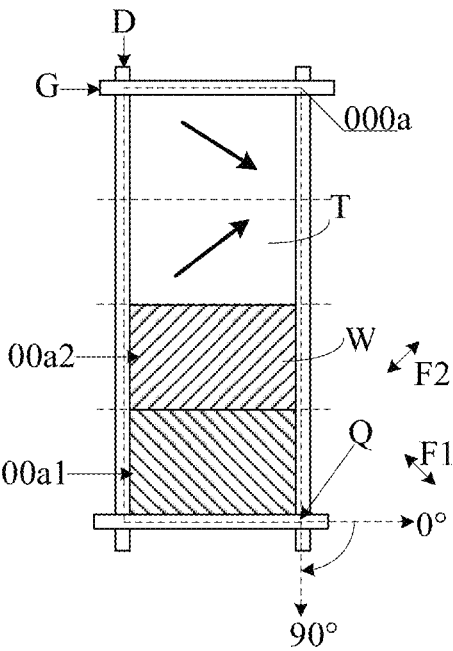
FIG. 20 is a schematic diagram of a first alignment film in contact with a first electrode according to some embodiments of the present disclosure.
Figure 21:
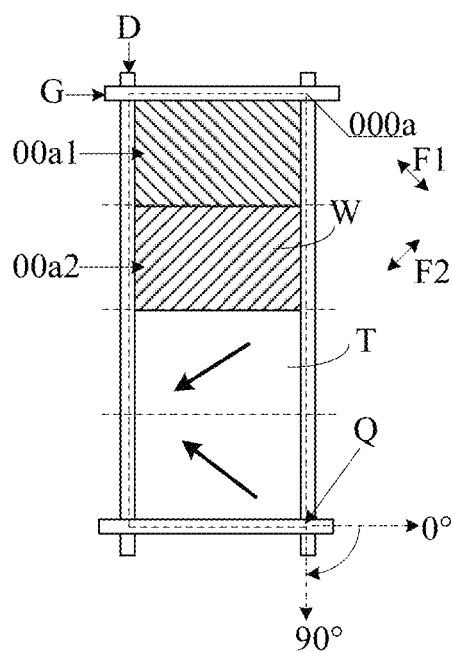
FIG. 21 is a schematic diagram of a second alignment film in contact with a second electrode according to some embodiments of the present disclosure.

In a second case, in each sub-pixel region 000a, the 4N first electrodes 102 include 2N strip electrodes W and 2N planar electrodes T, and two sequentially arranged strip electrodes and two sequentially arranged planar electrodes are alternately arranged. Referring to FIG. 20 and FIG. 21, FIG. 20 is a schematic diagram of a first alignment film in contact with a first electrode according to some embodiments of the present disclosure, and FIG. 21 is a schematic diagram of a second alignment film in contact with a second electrode according to some embodiments of the present disclosure. Both FIG. 20 and FIG. 21 are top views at a side from the second substrate 200 to the first substrate 100. For example, in the case that N is equal to 1, two sequentially arranged strip electrodes W and two sequentially arranged planar electrodes T in four first electrodes 102 in one sub-pixel region 000a are arranged in a single column as shown in FIG. 20, and two sequentially arranged strip electrodes W and two sequentially arranged planar electrodes T in four first electrodes 102 in one sub-pixel region 000a are arranged in a single column as shown in FIG. 21.

In this case, only the first alignment films 103 in contact with two sequentially arranged planar electrodes T are optically aligned, and only the second alignment films 203 in contact with two sequentially arranged planar electrodes T are optically aligned. Processes and principles of aligning the first alignment films 103 in contact with two sequentially arranged planar electrodes T are referred to the description in above embodiments, processes and principles of aligning the second alignment films 203 in contact with two sequentially arranged planar electrodes T are also referred to the description in above embodiments, and the alignment effect and arrangement of the liquid crystal molecules 301 are also referred to the description in above embodiments, which are not limited in the present disclosure.

It should be noted that, in the case that N is greater than or equal to 2, arrangement of 4N first electrodes 102 in each sub-pixel region 000a includes above two cases. For example, in the case that N is equal to 2, first four first electrodes 102 in each sub-pixel region 000a are arranged in above first case, and the last first electrodes 102 in each sub-pixel region 000a are arranged in above second case.

Figure 22:
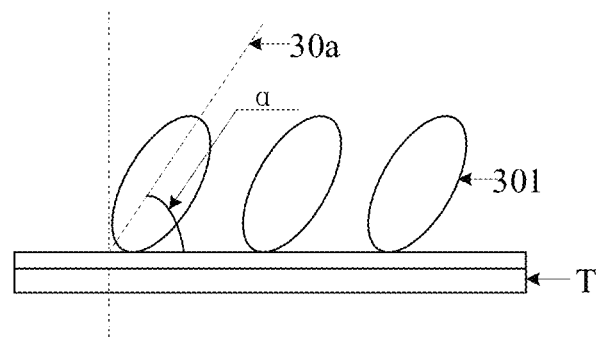
FIG. 22 is a schematic diagram of liquid crystal molecules and a planar electrode in a first sub-region according to some embodiments of the present disclosure.
Figure 23:
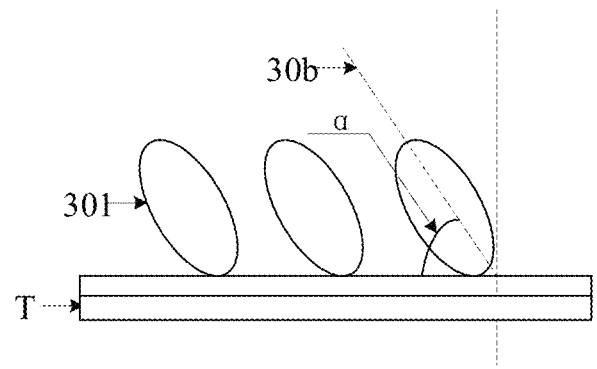
FIG. 23 is a schematic diagram of liquid crystal molecules and a planar electrode in a first sub-region according to some embodiments of the present disclosure.

In the embodiments of the present disclosure, referring to FIG. 22 and FIG. 23, FIG. 22 is a schematic diagram of liquid crystal molecules and a planar electrode in a first sub-region according to some embodiments of the present disclosure, and FIG. 23 is a schematic diagram of liquid crystal molecules and a planar electrode in a first sub-region according to some embodiments of the present disclosure. After liquid crystal molecules 301 on the side, proximal to the planar electrode T, of the liquid crystal layer 300 are aligned, tilting angles α between the major axes of the liquid crystal molecules and the target plane are greater than or equal to 87°, and are less than 90°. Specifically, the principle of the optical alignment is that a surface of the alignment film generates polymer driving the liquid crystal molecules 301 to arrange in a specific direction after the alignment film is irradiated with the ultraviolet light in optically aligning the alignment film, and the polymer is capable of driving the liquid crystal molecules 301 to arrange in major axes direction at a specific tilting angle α. It should be noted that, the major axis direction of the liquid crystal molecule is a direction in which a length of the liquid crystal molecule is greater.

In the embodiments of the present disclosure, in the 2N first sub-regions 00a1, the major axes of the liquid crystal molecules 301 on the sides, proximal to the planar electrode T, of N first sub-regions 00a1 extend in a first tilting direction 30a, and the major axes of the liquid crystal molecules 301 on the sides, proximal to the planar electrode T, of the other N first sub-regions 00a1 extend in a second tilting direction 30b. The first tilting direction 30a and the second tilting direction 30b are different, extension directions of orthogonal projections of the first tilting direction 30a and the second tilting direction 30b on the target plane are parallel to the first extension direction F1.

In this case, taking the first sub-region 00a1 of the liquid crystal molecules 301 of which the major axes extend in the first tilting direction 30a as an example, in the case that the liquid crystal display panel 000 applies the electric field force to the first sub-regions 00a1, the liquid crystal molecules 301 on a side, most proximal to the planar electrode T, of the liquid crystal layer 300 sequentially deflect from the first tilting direction 30a to the target plane under the action of the electric field force, such that light transmits the liquid crystal molecules 301 in the sub-pixel regions 000a. Furthermore, as the major axes of the liquid crystal molecules 301, most proximal to the strip electrode W, in the liquid crystal layer 300 are perpendicular to the target plane, and the extension direction of the slit in the strip electrode W is the same as a direction of an orthogonal projection of the first tilting direction 30a on the target plane, deflection directions of the liquid crystal molecules 301, most proximal to the strip electrode W, in the liquid crystal layer 300 are the same as deflection directions of the liquid crystal molecules 301, most proximal to the planar electrode T, in the liquid crystal layer 300 under the action of the electric field force. As such, all liquid crystal molecules 301 in the first sub-region 00a1 deflect in a same direction, and the response speed of the liquid crystal display panel 000 is great.

In the embodiments of the present disclosure, in the 2N second sub-regions 00a2, major axes of liquid crystal molecules 301 on sides, proximal to the planar electrode T, of N second sub-regions 00a2 extend in a third tilting direction, major axes of liquid crystal molecules 301 on sides, proximal to the planar electrode T, of the other N second sub-regions 00a2 extend in a fourth tilting direction. The third tilting direction and the fourth tilting direction are different, and extension directions of orthogonal projections of the third tilting direction 30c and the fourth tilting direction on the target plane are parallel to the second extension direction F2. Principles and structures of the third tilting direction and the fourth tilting direction refer to the principles and structures of the liquid crystal molecules 301 in the 2N first sub-region 00a1, which are not described in the present disclosure.

In the present disclosure, as the 4N sub-pixel sub-regions 00a are organized into one group or N groups that are adjacent to each other, one group of sub-pixel sub-regions 00a includes two first sub-regions 00a1 and two second sub-regions 00a2, and N is an integer greater than or equal to 1, structures of the sub-pixel sub-regions 00a in the plurality of sub-pixel regions 000a arranged in the array are same, such that a great display effect of the liquid crystal display panel 000 is ensured.

In some embodiments, for convenient description hereinafter, a point Q is assumed as an origin point. Tilting extension directions of the liquid crystal molecules 301 in the first sub-regions 00a1 and the second sub-regions 00a2 in the liquid crystal display panel 000 are described by taking the point Q being the origin point, a horizontally rightward 0 degree direction being a positive direction of X axis, and a direction of a 90 degrees clockwise rotation being a positive direction of Y axis. As the sub-regions in the same group of sub-pixel sub-regions 00a are arranged in many manners, the embodiments of the present disclosure merely illustrate in following two cases.

Figure 24:
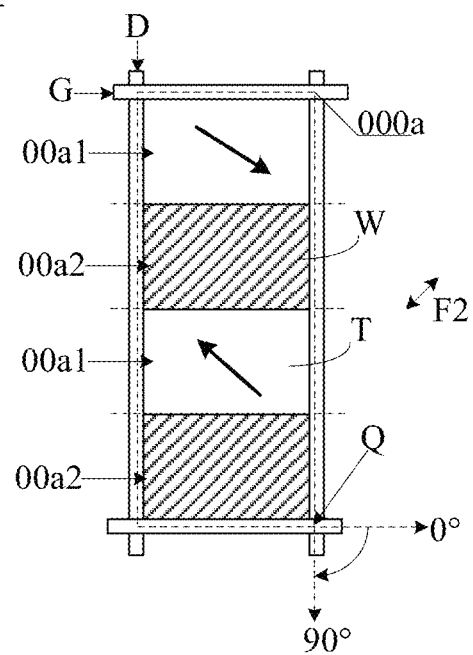
FIG. 24 is a schematic diagram of another first alignment film in contact with a first electrode according to some embodiments of the present disclosure.
Figure 25:
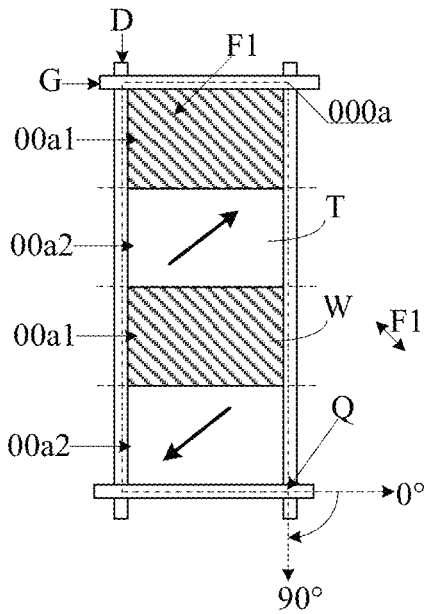
FIG. 25 is a schematic diagram of another second alignment film in contact with a second electrode according to some embodiments of the present disclosure.

In a first case, referring to FIG. 24 and FIG. 25, FIG. 24 is a schematic diagram of another first alignment film in contact with a first electrode according to some embodiments of the present disclosure, and FIG. 25 is a schematic diagram of another second alignment film in contact with a second electrode according to some embodiments of the present disclosure. Both FIG. 24 and FIG. 25 are top views at the side from the second substrate 200 to the first substrate 100. In the same group of sub-pixel sub-regions 00a, each first sub-region 00a1 and each second sub-region 00a2 are alternately arranged. First electrodes 102 in the first sub-regions 00a1 are planar electrodes, and second electrodes 202 in the first sub-regions 00a1 are strip electrodes, first electrodes 102 in the second sub-regions 00a2 are strip electrodes, and second electrodes 202 in the second sub-regions 00a2 are planar electrodes. In this case, extension directions of orthogonal projections of the major axes of the liquid crystal molecules 301 on a side, in contact with the planar electrode T, of the first alignment film 103 in the two first sub-regions 00a1 on the target plane are parallel to the first extension direction F1, and extension directions of orthogonal projections of the major axes of the liquid crystal molecules 301 on a side, in contact with the planar electrode T, of the second alignment film 203 in the two second sub-regions 00a2 on the target plane are parallel to the second extension direction F2.

In some embodiments, angles between extension directions of the orthogonal projections of the major axes of the liquid crystal molecules 301 in the two first sub-regions 00a1, sequentially arranged in a 90° direction in the same group of sub-pixel sub-regions 00a, on the target plane and a 0° direction are respectively 45° and 225°, and angles between the extension directions of the orthogonal projections of the major axes of the liquid crystal molecules 301 in the two first sub-regions 00a1 on the target plane is 180°. Angles between extension directions of the orthogonal projections of the major axes of the liquid crystal molecules 301 in the two second sub-regions 00a2, sequentially arranged in the 90° direction in the same group of sub-pixel sub-regions 00a, on the target plane and the 0° direction are respectively 315° and 135°, and angles between the extension directions of the orthogonal projections of the major axes of the liquid crystal molecules 301 in the two second sub-regions 00a2 on the target plane is 180°.

In a second case, in the same group of sub-pixel sub-regions 00a, the two second sub-regions 00a2 are arranged between the two first sub-regions 00a1. The first electrode 102 in one of the two first sub-regions 00a1 is the strip electrode W, and the first electrode in the other of the two first sub-regions 00a1 is the planar electrode T, the first electrode 102 in one of the two second sub-regions 00a2 is the strip electrode W, and the first electrode in the other of the two second sub-regions 00a2 is the planar electrode T.

In this case, directions of optically aligning the planar electrodes T in the first sub-regions 00a1 and the planar electrodes T in the second sub-regions 00a2 are combined in many manners, and the embodiments of the present disclosure merely illustrate in following two manners.

In the present disclosure, extension directions of the orthogonal projections of the major axes of the liquid crystal molecules 301 on the side, in contact with the planar electrode T, of the alignment film in the first sub-regions 00a1 on the target plane are parallel to the first extension direction F1, and extension directions of the orthogonal projections of the major axes of the liquid crystal molecules 301 on the side, in contact with the planar electrode T, of the alignment film in the second sub-regions 00a2 on the target plane are parallel to the second extension direction F2.

In a first manner, as shown in FIG. 20, angles between the extension directions of the orthogonal projections of the major axes of the liquid crystal molecules 301 on the side, in contact with the planar electrode T, of the first alignment film 103 in one first sub-regions 00a1 on the target plane and the 0° direction are 45°, angles between the extension directions of the orthogonal projections of the major axes of the liquid crystal molecules 301 on the side, in contact with the planar electrode T, of the first alignment film 103 in one second sub-regions 00a2 on the target plane and the 0° direction are 315°. As shown in FIG. 21, angles between the extension directions of the orthogonal projections of the major axes of the liquid crystal molecules 301 on the side, in contact with the planar electrode T, of the second alignment film 203 in the other first sub-regions 00a1 on the target plane and the 0° direction are 225°, angles between the extension directions of the orthogonal projections of the major axes of the liquid crystal molecules 301 on the side, in contact with the planar electrode T, of the second alignment film 203 in the other second sub-regions 00a2 on the target plane and the 0° direction are 135°.

In a second manner, as shown in FIG. 17, angles between the extension directions of the orthogonal projections of the major axes of the liquid crystal molecules 301 on the side, in contact with the planar electrode T, of the first alignment film 103 in one first sub-regions 00a1 on the target plane and the 0° direction are 45°, angles between the extension directions of the orthogonal projections of the major axes of the liquid crystal molecules 301 on the side, in contact with the planar electrode T, of the first alignment film 103 in one second sub-regions 00a2 on the target plane and the 0° direction are 315°. As shown in FIG. 19, angles between the extension directions of the orthogonal projections of the major axes of the liquid crystal molecules 301 on the side, in contact with the planar electrode T, of the second alignment film 203 in the other first sub-regions 00a1 on the target plane and the 0° direction are 225°, angles between the extension directions of the orthogonal projections of the major axes of the liquid crystal molecules 301 on the side, in contact with the planar electrode T, of the second alignment film 203 in the other second sub-regions 00a2 on the target plane and the 0° direction are 135°.

It should be noted that, the first extension direction F1 is perpendicular to the second extension direction F2. As such, 45° angles are always present between the directions of the major axes of the liquid crystal molecules 301 and the 90° direction in the same group of sub-pixel sub-regions 00a. Thus, when transmitting the sub-pixel regions 000a under the action of the electric field force, the light is in four directions that are perpendicular to each other, such that the liquid crystal display panel displays screens with less color difference in four directions that are perpendicular to each other. In addition, the liquid crystal molecules 301 have the great domino effect under the action of the electric field force, and the response speed of the liquid crystal display panel is further improved.

For above two types of optional embodiments, in aligning the liquid crystal display panel in the embodiments of the present disclosure, the panel merely moves in the X direction to achieve the optical alignment of the alignment film in the sub-pixel regions 000a. As the panel does not move in two directions, the process of manufacturing the liquid crystal display panel is simplified.

Figure 26:
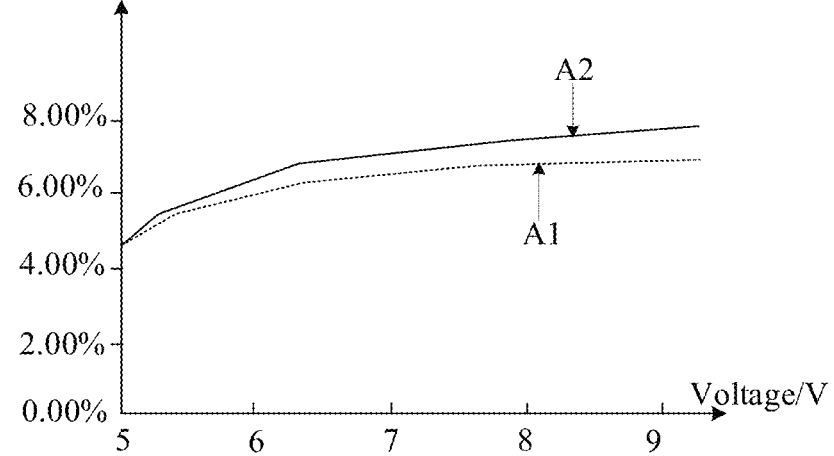
FIG. 26 is a diagram of a simulation result of transmission of a liquid crystal display panel according to some embodiments of the present disclosure.

Referring to FIG. 26, FIG. 26 is a diagram of a simulation result of transmission of a liquid crystal display panel according to some embodiments of the present disclosure. The curve A1 represents a curve of a transmission of a single sub-pixel region 0a in the liquid crystal display panel in some practices, and the single sub-pixel region 0a refers to the sub-pixel region 0a shown in FIG. 6. The curve A2 represents a curve of a transmission of a single sub-pixel region 000a in the liquid crystal display panel in the present disclosure, and the single sub-pixel region 000a refers to the sub-pixel region 000a that is disposed to be opposite shown in FIG. 17 and FIG. 19. Compared with dark lines in the length direction and the width direction of the single sub-pixel region 0a in some practices, dark lines are merely generated in the width direction of the single sub-pixel region 000a in the present disclosure. As such, the transmission of the light in the liquid crystal display panel in curve A2 is greater than the transmission of the light in the liquid crystal display panel in curve A1. In some embodiments, the transmission in curve A2 is obviously greater than the transmission in curve A1 in a range of voltage from 5V to 9V.

In summary, the liquid crystal display panel provided in the embodiments of the present disclosure includes: a first substrate and a second substrate that are opposite to each other, and a liquid crystal layer between the first substrate and the second substrate. The liquid crystal display panel includes a plurality of sub-pixel regions. Each of the plurality of sub-pixel regions includes 4N sub-pixel sub-regions arranged in a single column, and the 4N sub-pixel sub-regions are organized into one group, or a plurality of groups that are adjacent to each other. A same group of sub-pixel sub-regions includes two first sub-regions and two second sub-regions. N is an integer greater than or equal to 1. As such, alignment of liquid crystal molecules in two adjacent sub-pixel sub-regions is different, and dark lines generated at an interface are arranged in one direction. Therefore, transmission of the liquid crystal display panel is efficiently improved. In addition, uniformity of luminance of light from the sub-pixel regions is great, such that the display effect of the liquid crystal display panel is great.

A method for manufacturing a liquid crystal display panel is further provided in the embodiments of the present disclosure. The method for manufacturing the liquid crystal display panel includes as follows.

In S1, a first substrate including a first electrode and a first alignment film is formed.

In S2, a second substrate including a second electrode and a second alignment film is formed.

In S3, the first substrate and the second substrate are disposed to opposite to each other, and a liquid crystal layer is formed between the first substrate and the second substrate.

The liquid crystal display panel includes a plurality of sub-pixel regions. Each of the plurality of sub-pixel regions includes 2N first sub-regions and 2N second sub-regions arranged in a single column. N is an integer greater than or equal to 1. Each of sub-pixel sub-regions includes one first electrode and one second electrode.

One of the first electrode and the second electrode is a strip electrode, and the other of the first electrode and the second electrode is a planar electrode. The strip electrode includes a plurality of electrode strips, and a slit is present between two adjacent electrode strips of the plurality of electrode strips.

The first electrode is in contact with the first alignment film in the case that the first electrode is the strip electrode, and the second electrode is in contact with the second alignment film in the case that the second electrode is the strip electrode.

4N sub-pixel sub-regions include 2N first sub-regions and 2N second sub-regions. A primary extension direction of electrode strips in the 2N first sub-regions is a first extension direction, and a primary extension direction of electrode strips in the 2N second sub-regions is a second extension direction. The first extension direction and the second extension direction are different.

It should be noted that, in forming the first substrate including the first electrode and the first alignment film, the first alignment film is formed on the first electrode in the first substrate by any one of depositing, coating, sputtering, and the like. In forming the second substrate including the second electrode and the second alignment film, the second alignment film is formed on the common electrode in the second substrate by any one of depositing, coating, sputtering, and the like. Materials for forming the first alignment film and the second alignment film are a material with an alignment function, for example, polyimide, which are not limited in the embodiments of the present disclosure.

It should be noted that, as one of the first electrode and the second electrode is a strip electrode, the other of the first electrode and the second electrode is a planar electrode, the strip electrode includes a plurality of electrode strips, and a slit is present between two adjacent electrode strips of the plurality of electrode strips, one of the first electrode and the second electrode includes the slit. The slit is formed by etching.

In the embodiments of the present disclosure, upon forming the first substrate including the first electrode and the first alignment film, the method further includes:

optically aligning a portion, in contact with the planar electrode, of the first alignment film, such that the portion, in contact with the planar electrode, of the first alignment film is capable of aligning liquid crystal molecules in the liquid crystal layer.

Upon forming the second substrate including the second electrode and the second alignment film, the method further includes:

optically aligning a portion, in contact with the planar electrode, of the second alignment film, such that the portion, in contact with the planar electrode, of the second alignment film is capable of aligning the liquid crystal molecules in the liquid crystal layer.

It is obvious for those skilled in the art to understand that, above specific principles of the liquid crystal display panel are referred to corresponding descriptions in the structure of the liquid crystal display panel in above embodiments for convenient and simply description, which are not repeated herein.

Figure 27:
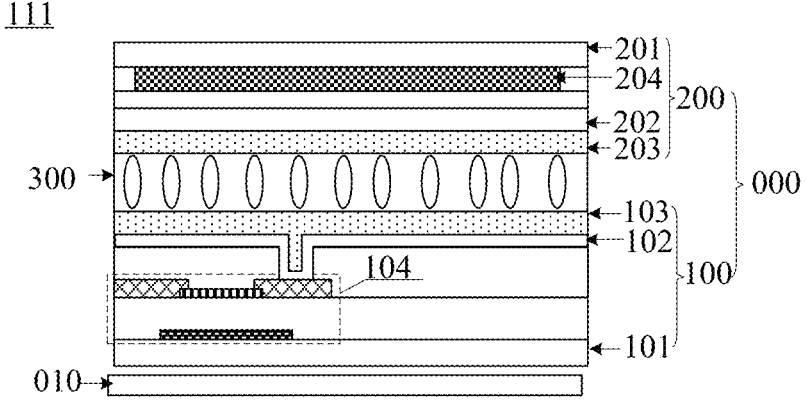
FIG. 27 is a schematic diagram of a film layer structure of a display device according to some embodiments of the present disclosure.

A display device is further provided in the embodiments of the present disclosure. The display device is any device with a display function, for example, a smart phone, a smart computer, a television, a navigator, a smart wearable device, and the like. Referring to FIG. 27, FIG. 27 is a schematic diagram of a film layer structure of a display device according to some embodiments of the present disclosure. The display device 111 includes: a back light source 010 and the liquid crystal display panel 000 shown in FIG. 7 or FIG. 11.

The back light source 010 is disposed on a back face of the liquid crystal display panel 000, and light from the back light source 010 emits to the liquid crystal display panel. For example, in the case that liquid crystal molecules in the liquid crystal display panel 000 are sequentially deflected under the action of the electric field force, light from the back light source 010 transmits the liquid crystal display panel 000, and thus, the liquid crystal display panel 000 displays images.

It is noted that in the accompanying drawings, the sizes of the layers and regions are exaggerated for clear illustration. In addition, it is understood that when an element or a layer is disposed "on" another element or layer, the element is directly disposed on the another element or there is an intervening layer. In addition, it is understood that when an element or a layer is disposed "under" another element or layer, the element is directly located under the another element or there are more than one intervening layer or element. In addition, it is further understood that when a layer or an element is disposed "between" two layers or elements, the layer or element is the only one layer between the two layers or elements or there are more than one intervening layer or element. Similar reference numerals indicate similar elements throughout the present disclosure.

In the present disclosure, the terms "first" and "second" are used to descriptive purposes, and are not construed to indicate or imply relative importance. Unless expressly limited otherwise, the term "a plurality of" refers to two or more.

Described above are example embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A liquid crystal display panel, wherein
the liquid crystal display panel comprises a plurality of sub-pixel regions, wherein each of the plurality of sub-pixel regions comprises 4N sub-pixel sub-regions arranged in a single column, N being an integer greater than or equal to 1; and
the liquid crystal display panel comprises: a first substrate and a second substrate that are opposite to each other, and a liquid crystal layer between the first substrate and the second substrate; wherein a first alignment film is provided on a side, proximal to the liquid crystal layer, of the first substrate, and a second alignment film is provided on a side, proximal to the liquid crystal layer, of the second substrate;
wherein each of the 4N sub-pixel sub-regions comprises one first electrode and one second electrode, wherein one of the first electrode and the second electrode is a strip electrode, and the other of the first electrode and the second electrode is a planar electrode, wherein the strip electrode comprises a plurality of electrode strips, and a slit is present between two adjacent electrode strips of the plurality of electrode strips;
the first electrode is disposed on a side, distal from the liquid crystal layer, of the first alignment film, and the second electrode is disposed on a side, distal from the liquid crystal layer, of the second alignment film; and
the first electrode is in contact with the first alignment film in the case that the first electrode is the strip electrode, and the second electrode is in contact with the second alignment film in the case that the second electrode is the strip electrode; and
the 4N sub-pixel sub-regions comprise 2N first sub-regions and 2N second sub-regions, wherein a primary extension direction of electrode strips in the 2N first sub-regions is a first extension direction, and a primary extension direction of electrode strips in the 2N second sub-regions is a second extension direction, the first extension direction being different from the second extension direction,
wherein in each of the plurality of sub-pixel regions,
the first electrodes in N first sub-regions of the 2N first sub-regions are the strip electrodes, the first electrodes in the other N first sub-regions of the 2N first sub-regions are the planar electrodes, the first electrodes in N second sub-regions of the 2N second sub-regions are the strip electrodes, and the first electrodes in the other N second sub-regions of the 2N second sub-regions are the planar electrodes; or
all first electrodes in the 2N first sub-regions are one of the strip electrodes and the planar electrodes, and all first electrodes in the 2N second sub-regions are the other one of the strip electrodes or the planar electrodes.

2. The liquid crystal display panel according to claim 1, wherein both the first electrode and the second electrode are transparent electrodes, and in each of the plurality of sub-pixel regions, the first electrodes in the 4N sub-pixel sub-regions are sequentially arranged in a same layer, and the second electrodes in the 4N sub-pixel sub-regions are sequentially arranged in a same layer.

3. The liquid crystal display panel according to claim 1, wherein in each of the plurality of sub-pixel regions, the 4N first electrodes comprise: 2N strip electrodes and 2N planar electrodes, and two sequentially arranged strip electrodes and two sequentially arranged planar electrodes are alternately arranged.

4. The liquid crystal display panel according to claim 1, wherein in each of the plurality of sub-pixel regions, the 4N first electrodes comprise: 2N strip electrodes and 2N planar electrodes, and each of the 2N strip electrodes and each of the 2N planar electrodes are alternately arranged.

5. The liquid crystal display panel according to claim 1, wherein
in the 2N first sub-regions, major axes of liquid crystal molecules on sides, proximal to the planar electrode, of N first sub-regions extend in a first tilting direction, major axes of liquid crystal molecules on sides, proximal to the planar electrode, of the other N first sub-regions extend in a second tilting direction, wherein the first tilting direction is different from the second tilting direction, and extension directions of orthogonal projections of the first tilting direction and the second tilting direction on a target plane are parallel to the first extension direction;
in the 2N second sub-regions, major axes of liquid crystal molecules on sides, proximal to the planar electrode, of N second sub-regions extend in a third tilting direction, major axes of liquid crystal molecules on sides, proximal to the planar electrode, of the other N second sub-regions extend in a fourth tilting direction, wherein the third tilting direction is different from the fourth tilting direction, and extension directions of orthogonal projections of the third tilting direction and the fourth tilting direction on the target plane are parallel to the second extension direction;
wherein the target plane is a plane parallel to the liquid crystal display panel.

6. The liquid crystal display panel according to claim 5, wherein tilting angles between major axes of liquid crystal molecules on a side, proximal to the planar electrode, of the liquid crystal layer and the target plane are greater than or equal to 87° and are less than 90°.

7. The liquid crystal display panel according to claim 6, wherein in each of the plurality of sub-pixel regions, the 4N sub-pixel sub-regions are organized into one group, or a plurality of groups that are adjacent to each other, wherein a same group of sub-pixel sub-regions comprises two first sub-regions and two second sub-regions.

8. The liquid crystal display panel according to claim 7, wherein in the same group of sub-pixel sub-regions, the two first sub-regions and the two second sub-regions are alternately arranged; the first electrodes in the two first sub-regions are the planar electrodes, and the second electrodes in the two first sub-regions are the strip electrodes; and the first electrodes in the two second sub-regions are the strip electrodes, and the second electrodes in the two second sub-regions are the planar electrodes.

9. The liquid crystal display panel according to claim 7, wherein in the same group of sub-pixel sub-regions, the two second sub-regions are arranged between the two first sub-regions; the first electrode in one of the two first sub-regions is the strip electrode, and the first electrode in the other of the two first sub-regions is the planar electrode; and the first electrode in one of the two second sub-regions is the strip electrode, and the first electrode in the other of the two second sub-regions is the planar electrode.

10. The liquid crystal display panel according to claim 1, wherein N is equal to 1.

11. The liquid crystal display panel according to claim 1, wherein the first substrate is an array substrate, the first electrode is a pixel electrode, the second substrate is a color film substrate, and the second electrode is a common electrode.

12. The liquid crystal display panel according to claim 1, wherein the first extension direction is perpendicular to the second extension direction.

13. A method for manufacturing a liquid crystal display panel, comprising:
 forming a first substrate comprising a first electrode and a first alignment film;
 forming a second substrate comprising a second electrode and a second alignment film; and
 disposing the first substrate and the second substrate to be opposite to each other, and forming a liquid crystal layer between the first substrate and the second substrate;
 wherein
 the liquid crystal display panel comprises a plurality of sub-pixel regions, wherein each of the plurality of sub-pixel regions comprises 2N first sub-regions and 2N second sub-regions arranged in a single column, N being an integer greater than or equal to 1; and each of sub-pixel sub-regions comprises one first electrode and one second electrode, wherein
 one of the first electrode and the second electrode is a strip electrode, and the other of the first electrode and the second electrode is a planar electrode, wherein the strip electrode comprises a plurality of electrode strips, and a slit is present between two adjacent electrode strips of the plurality of electrode strips, and
 the first electrode is in contact with the first alignment film in the case that the first electrode is the strip electrode, and the second electrode is in contact with the second alignment film in the case that the second electrode is the strip electrode; and
 4N sub-pixel sub-regions comprise 2N first sub-regions and 2N second sub-regions, wherein a primary extension direction of electrode strips in the 2N first sub-regions is a first extension direction, and a primary extension direction of electrode strips in the 2N second sub-regions is a second extension direction, the first extension direction being different from the second extension direction,
 wherein in each of the plurality of sub-pixel regions,
 the first electrodes in N first sub-regions of the 2N first sub-regions are the strip electrodes, the first electrodes in the other N first sub-regions of the 2N first sub-regions are the planar electrodes, the first electrodes in N second sub-regions of the 2N second sub-regions are the strip electrodes, and the first electrodes in the other N second sub-regions of the 2N second sub-regions are the planar electrodes; or
 all first electrodes in the 2N first sub-regions are one of the strip electrodes and the planar electrodes, and all first electrodes in the 2N second sub-regions are the other one of the strip electrodes or the planar electrodes.

14. The method according to claim 13, wherein
 upon forming the first substrate comprising the first electrode and the first alignment film, the method further comprises:
 optically aligning a portion, in contact with the planar electrode, of the first alignment film, such that the portion, in contact with the planar electrode, of the first alignment film is capable of aligning liquid crystal molecules in the liquid crystal layer; and
 upon forming the second substrate comprising the second electrode and the second alignment film, the method further comprises:
 optically aligning a portion, in contact with the planar electrode, of the second alignment film, such that the portion, in contact with the planar electrode, of the second alignment film is capable of aligning the liquid crystal molecules in the liquid crystal layer.

15. A display device, comprising: a backlight source and a liquid crystal display panel, wherein
 the liquid crystal display panel comprises a plurality of sub-pixel regions, wherein each of the plurality of sub-pixel regions comprises 4N sub-pixel sub-regions arranged in a single column, N being an integer greater than or equal to 1; and
 the liquid crystal display panel comprises: a first substrate and a second substrate that are opposite to each other, and a liquid crystal layer between the first substrate and the second substrate; wherein a first alignment film is provided on a side, proximal to the liquid crystal layer, of the first substrate, and a second alignment film is provided on a side, proximal to the liquid crystal layer, of the second substrate;
 wherein each of the 4N sub-pixel sub-regions comprises one first electrode and one second electrode, wherein
 one of the first electrode and the second electrode is a strip electrode, and the other of the first electrode and the second electrode is a planar electrode, wherein the strip electrode comprises a plurality of electrode strips, and a slit is present between two adjacent electrode strips of the plurality of electrode strips;
 the first electrode is disposed on a side, distal from the liquid crystal layer, of the first alignment film, and the second electrode is disposed on a side, distal from the liquid crystal layer, of the second alignment film; and
 the first electrode is in contact with the first alignment film in the case that the first electrode is the strip electrode, and the second electrode is in contact with the second alignment film in the case that the second electrode is the strip electrode; and
 the 4N sub-pixel sub-regions comprise 2N first sub-regions and 2N second sub-regions, wherein a primary extension direction of electrode strips in the 2N first sub-regions is a first extension direction, and a primary extension direction of electrode strips in the 2N second sub-regions is a second extension direction, the first extension direction being different from the second extension direction,
 wherein in each of the plurality of sub-pixel regions,
 the first electrodes in N first sub-regions of the 2N first sub-regions are the strip electrodes, the first electrodes in the other N first sub-regions of the 2N first sub-regions are the planar electrodes, the first electrodes in N second sub-regions of the 2N second sub-regions are the strip electrodes, and the first electrodes in the other N second sub-regions of the 2N second sub-regions are the planar electrodes; or all first electrodes in the 2N first sub-regions are one of the strip electrodes and the planar electrodes, and all first electrodes in the 2N second sub-regions are the other one of the strip electrodes or the planar electrodes.

16. The display device according to claim 15, wherein both the first electrode and the second electrode are transparent electrodes, and in each of the plurality of sub-pixel regions, the first electrodes in the 4N sub-pixel sub-regions are sequentially arranged in a same layer, and the second electrodes in the 4N sub-pixel sub-regions are sequentially arranged in a same layer.

* * * * *